(12) United States Patent
Tsuiki et al.

(10) Patent No.: US 10,153,673 B2
(45) Date of Patent: Dec. 11, 2018

(54) PRODUCTION METHOD FOR ROTATING ELECTRICAL MACHINE

(71) Applicant: MITSUBISHI ELECTRIC CORPORATION, Chiyoda-ku, Tokyo (JP)

(72) Inventors: Hironori Tsuiki, Tokyo (JP); Hiroyuki Akita, Tokyo (JP); Akira Hashimoto, Tokyo (JP); Koji Kawamura, Tokyo (JP); Sachiko Kawasaki, Tokyo (JP); Atsushi Sakaue, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 121 days.

(21) Appl. No.: 15/119,929

(22) PCT Filed: May 8, 2015

(86) PCT No.: PCT/JP2015/063327
§ 371 (c)(1),
(2) Date: Aug. 18, 2016

(87) PCT Pub. No.: WO2015/182346
PCT Pub. Date: Dec. 3, 2015

(65) Prior Publication Data
US 2017/0179780 A1 Jun. 22, 2017

(30) Foreign Application Priority Data

May 26, 2014 (JP) ................................ 2014-107661

(51) Int. Cl.
*H02K 15/04* (2006.01)
*H02K 3/12* (2006.01)
(Continued)

(52) U.S. Cl.
CPC ............ *H02K 3/12* (2013.01); *H02K 15/0037* (2013.01); *H02K 15/045* (2013.01); *H02K 15/0464* (2013.01); *H02K 15/066* (2013.01)

(58) Field of Classification Search
CPC .......... H02K 3/12; H02K 15/00; H02K 15/04; H02K 15/045; H02K 15/0435; H02K 15/0037; H02K 15/0025
(Continued)

(56) References Cited

U.S. PATENT DOCUMENTS

| | | | | |
|---|---|---|---|---|
| 5,304,884 A | * | 4/1994 | Kitajima | ............ H02K 3/04 310/179 |
| 6,404,091 B1 | | 6/2002 | Nakamura et al. | |

(Continued)

FOREIGN PATENT DOCUMENTS

| | | |
|---|---|---|
| CN | 102047538 A | 5/2011 |
| JP | 4-156244 A | 5/1992 |

(Continued)

OTHER PUBLICATIONS

International Search Report (PCT/ISA/210) dated Jul. 14, 2015, by the Japanese Patent Office as the International Searching Authority for International Application No. PCT/JP2015/063327.
(Continued)

*Primary Examiner* — Burton Mullins
(74) *Attorney, Agent, or Firm* — Buchanan Ingersoll & Rooney PC

(57) ABSTRACT

Bridge portions forming coil end portions, at both ends in an axial direction, of a stator of the rotating electrical machine according to the present invention are configured coaxially about an axis of the stator; at least one bridge portion of the bridge portions of each coil at both ends in the axial direction is located outward of an inner peripheral surface of
(Continued)

the stator; and a gap is present between an end surface of a stator core in the axial direction and each bridge portion.

5 Claims, 45 Drawing Sheets

(51) Int. Cl.
  *H02K 15/06* (2006.01)
  *H02K 15/00* (2006.01)
(58) Field of Classification Search
  USPC .......................................................... 29/596
  See application file for complete search history.

(56) References Cited

U.S. PATENT DOCUMENTS

| | | | | |
|---|---|---|---|---|
| 7,380,335 | B2* | 6/2008 | Hashimoto | ........ H02K 15/0457 |
| | | | | 140/92.1 |
| 8,141,232 | B2* | 3/2012 | Takada | ............... H02K 15/0421 |
| | | | | 29/596 |
| 8,330,318 | B2* | 12/2012 | Saito | ........................ H02K 3/12 |
| | | | | 310/179 |
| 2010/0102681 | A1 | 4/2010 | Koga et al. | |

FOREIGN PATENT DOCUMENTS

| | | |
|---|---|---|
| JP | 10-117452 | 5/1998 |
| JP | 2000-350425 A | 12/2000 |
| JP | 2007-181348 A | 7/2007 |
| JP | 2009-194996 A | 8/2009 |
| JP | 2011-172402 A | 9/2011 |
| JP | 2013-187951 A | 9/2013 |

OTHER PUBLICATIONS

Written Opinion (PCT/ISA/237) dated Jul. 14, 2015, by the Japanese Patent Office as the International Searching Authority for International Application No. PCT/JP2015/063327.

Office Action (Notice of Reasons for Rejection) dated Feb. 28, 2017, by the Japanese Patent Office in rresponding Japanese Patent Application No. 2016-523401, and an English Translation of the Office Action. (9 pages).

First Office Action dated Apr. 28, 2018 in corresponding Chinese Patent Application No. 201580027511.5, and an English translation thereof.

* cited by examiner

A-A CROSS SECTION

243

PRODUCTION METHOD FOR ROTATING ELECTRICAL MACHINE

TECHNICAL FIELD

The present invention relates to a rotating electrical machine having excellent coil cooling performance, and a production method for the rotating electrical machine.

BACKGROUND ART

In recent years, rotating electrical machines such as electric motors and electric generators are required to have a small size, high output, and high efficiency. For size reduction and output increase of such a rotating electrical machine, a rotating electrical machine including a stator of concentrated winding having a relatively high coil space factor is used. However, there is an increased demand for a rotating electrical machine including a stator using a coil having a distributed winding structure that allows for further output increase (see, for example, Patent Document 1). Here, whereas a coil of concentrated winding is formed by winding a conductor wire on a single tooth, a coil of distributed winding is formed by winding a conductor wire between slots that are spaced apart from each other by two slots or more.

CITATION LIST

Patent Document

Patent Document 1: Japanese Laid-Open Patent Publication No. 10-117452

SUMMARY OF THE INVENTION

Problems to be Solved by the Invention

In order to increase the output of a rotating electrical machine, it is necessary to efficiently dissipate heat generated by large current flowing through a coil. However, the conventional rotating electrical machine disclosed in Patent Document 1 has a problem that, since the coil is wound without gaps for the purpose of improving a space factor, the heat dissipation deteriorates, so that the output cannot be increased.

The present invention has been made to solve the above-described problem, and an object of the present invention is to provide a rotating electrical machine having improved coil cooling efficiency and having a small size, high output, and high efficiency, and a production method for the rotating electrical machine.

Solution to the Problems

A rotating electrical machine according to the present invention includes:

a stator having a stator core including an outer core as an annular back yoke portion and an inner core as a plurality of tooth portions, and a plurality of insulated and coated coils each received in two slots each formed between the two tooth portions adjacent to each other, the coils extending over the plurality of tooth portions of the stator core; and a rotor rotatably supported at an inner side of the stator core, wherein bridge portions of the coils form coil end portions of the stator at both ends in an axial direction and are configured coaxially about an axis of the stator, at least one bridge portion of the bridge portions of each coil at both ends in the axial direction is located outward of an inner peripheral surface of the stator, and a gap is present between an end surface of the stator core in the axial direction and each bridge portion.

In addition, a production method for a rotating electrical machine according to the present invention is a production method for a rotating electrical machine including: a stator having a stator core including an outer core as an annular back yoke portion and an inner core as a plurality of tooth portions, and a plurality of insulated and coated coils each received in two slots each formed between the two tooth portions adjacent to each other, the coils extending over the plurality of tooth portions of the stator core; and a rotor rotatably supported at an inner side of the stator core, the production method including:

a winding step of continuously forming intermediate coils each including two slot received portions to be received in the slots of the stator core and two bridge portions by which both end portions of the slot received portions are connected, into a flat plate shape from an insulated and coated conductor wire by using a winding frame;

a coil shaping step of twisting the two slot received portions of each intermediate coil and shaping each bridge portion into a circular arc shape;

a coil temporary mounting step of temporarily mounting each coil subjected to the coil shaping step, obliquely in the two slots;

a coil inserting step of pressing the slot received portions of each coil subjected to the coil temporary mounting step, from an outer side to a radially inner side to insert the slot received portions into the slots;

a core assembly step of inserting the inner core having each coil mounted thereon, into the outer core; and a final assembly step inserting the rotor into the stator and housing the stator and the rotor in a frame.

Effect of the Invention

In the rotating electrical machine according to the present invention, since bridge portions of the coils form coil end portions of the stator at both ends in an axial direction and are configured coaxially about an axis of the stator, at least one bridge portion of the bridge portions of each coil at both ends in the axial direction is located outward of an inner peripheral surface of the stator, and a gap is present between an end surface of the stator core in the axial direction and each bridge portion, it is possible to ensure a flow path for passing refrigerant such as air or cooling oil to improve coil cooling efficiency, while interference with another coil is suppressed.

In addition, since the production method for the rotating electrical machine according to the present invention includes:

a winding step of continuously forming intermediate coils each including two slot received portions to be received in the slots of the stator core and two bridge portions by which both end portions of the slot received portions are connected, into a flat plate shape from an insulated and coated conductor wire by using a winding frame;

a coil shaping step of twisting the two slot received portions of each intermediate coil and shaping each bridge portion into a circular arc shape;

a coil temporary mounting step of temporarily mounting each coil subjected to the coil shaping step, obliquely in the two slots;

a coil inserting step of pressing the slot received portions of each coil subjected to the coil temporary mounting step, from an outer side to a radially inner side to insert the slot received portions into the slots;

a core assembly step of inserting the inner core having each coil mounted thereon, into the outer core; and a final assembly step inserting the rotor into the stator and housing the stator and the rotor in a frame, it is possible to form a gap between the end surface of the inner core in the axial direction and each bridge portion, so that it is possible to ensure a flow path for passing refrigerant such as air or cooling oil to improve coil cooling efficiency, while interference with another coil is suppressed.

DESCRIPTION OF EMBODIMENTS

Embodiment 1

Hereinafter, a rotating electrical machine and a production method for the rotating electrical machine according to Embodiment 1 of the present invention will be described with reference to the drawings. In the present specification, the terms "circumferential direction, "radial direction", "axial direction", "inner", and "outer" refer to the "circumferential direction", the "radial direction", and the "axial direction" of a stator of the rotating electrical machine, the "inner side", the "outer side", the "outer periphery", and the "inner periphery" of the stator, and the like.

Figure 1:
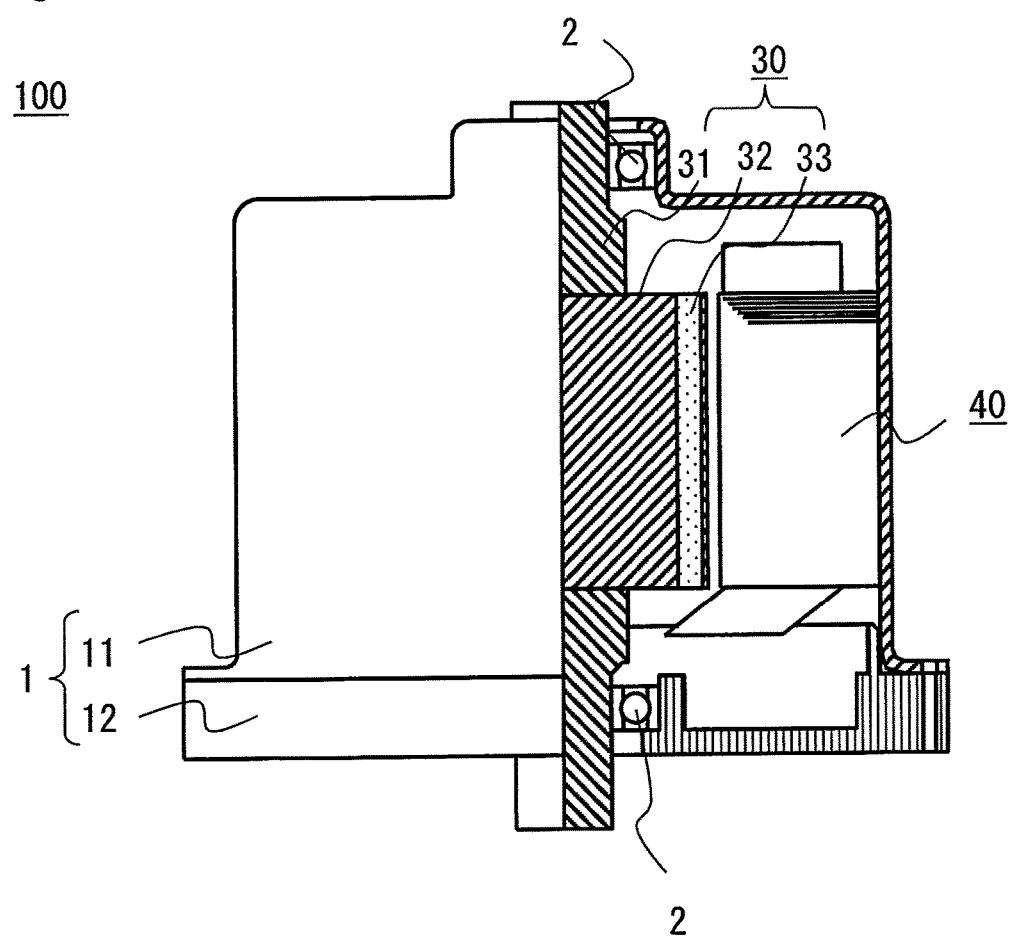
FIG. 1 is a single-side cross-sectional front schematic diagram of a rotating electrical machine according to Embodiment 1 of the present invention.

FIG. 1 is a single-side cross-sectional front schematic diagram of a rotating electrical machine 100 according to Embodiment 1 of the present invention.

Figure 2:
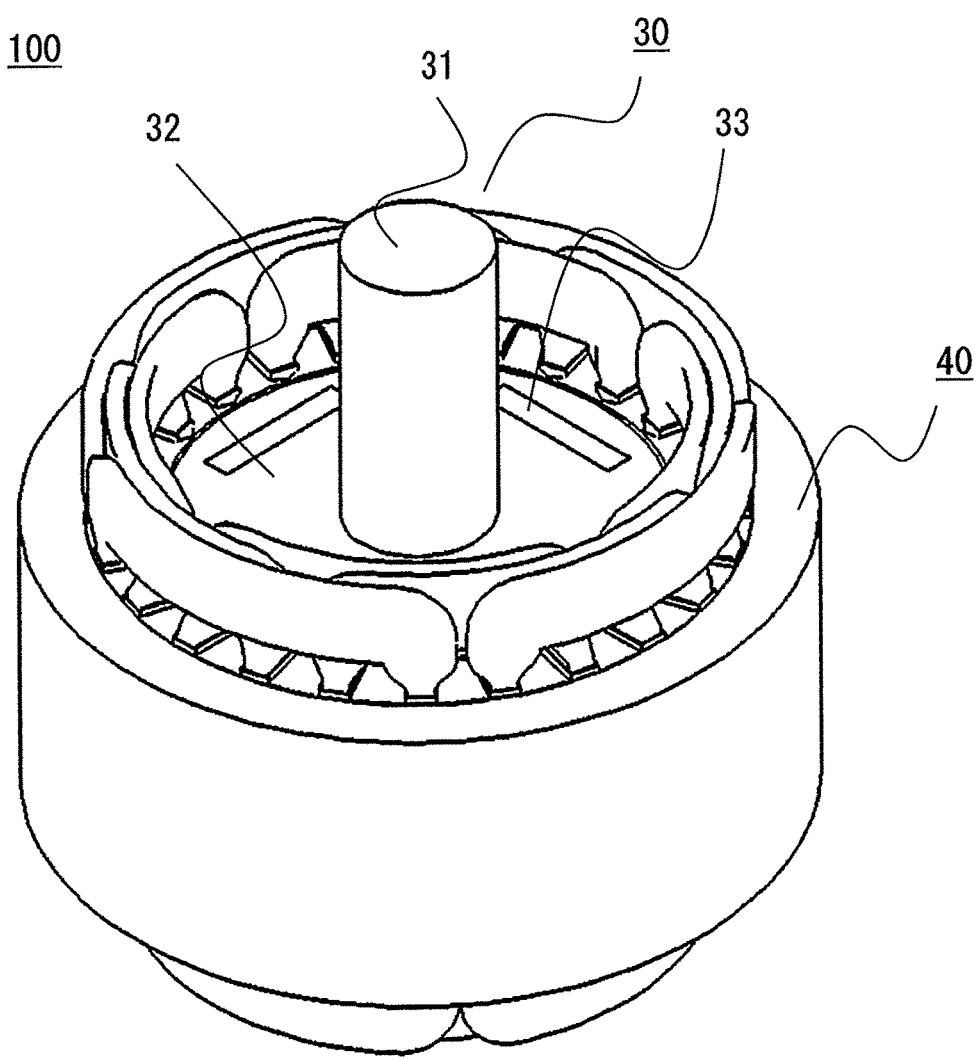
FIG. 2 is a perspective view of the rotating electrical machine (only a stator and a rotor) according to Embodiment 1 of the present invention.

FIG. 2 is a perspective view of the rotating electrical machine 100 (only a stator 40 and a rotor 30).

The rotating electrical machine 100 includes: a housing 1 that includes a frame 11 having a cylindrical shape with a bottom and an end plate 12 closing the opening of the frame 11; the stator 40 that is fixedly attached to the cylindrical portion of the frame 11 in an internally fitted state; and the rotor 30 that is rotatably supported on the bottom of the frame 11 and the end plate 12 via a bearing 2 and is disposed at the inner peripheral side of the stator 40.

The rotor 30 is a permanent magnet rotor that includes: a rotor core 32 that is fixedly attached to a rotary shaft 31; and permanent magnets 33 that are buried at the outer peripheral surface side of the rotor core 32 and at predetermined pitches in the circumferential direction and form magnetic poles.

The rotor 30 is not limited to the permanent magnet rotor, and a cage-type rotor that has a non-insulated rotor conductor received in a slot of a rotor core and is short-circuited at both sides thereof by a short-circuit ring, or a winding-type rotor that has an insulated conductor wire mounted in a slot of a rotor core, may be used.

Next, the configuration of the stator 40 will be described with reference to the drawings.

Figure 3:
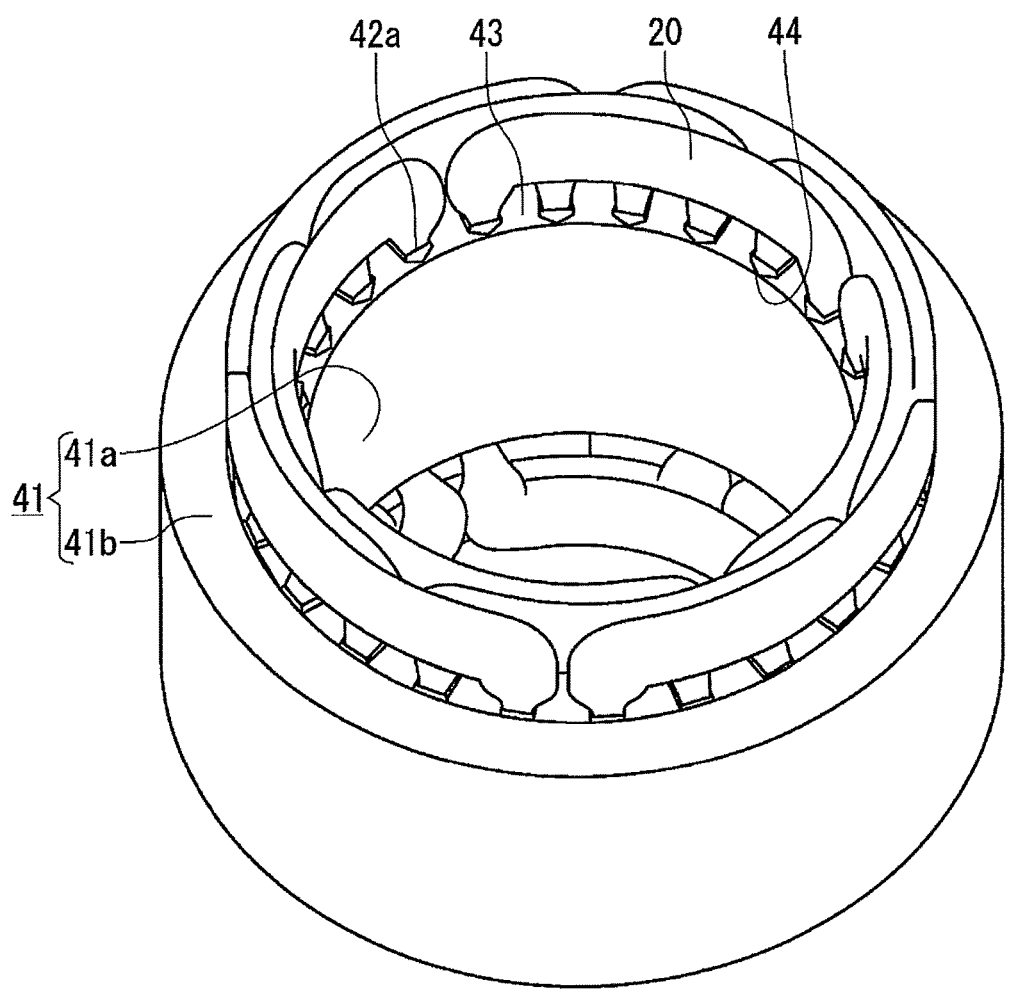
FIG. 3 is a perspective view of the stator according to Embodiment 1 of the present invention

FIG. 3 is a perspective view of the stator 40.

Figure 4:
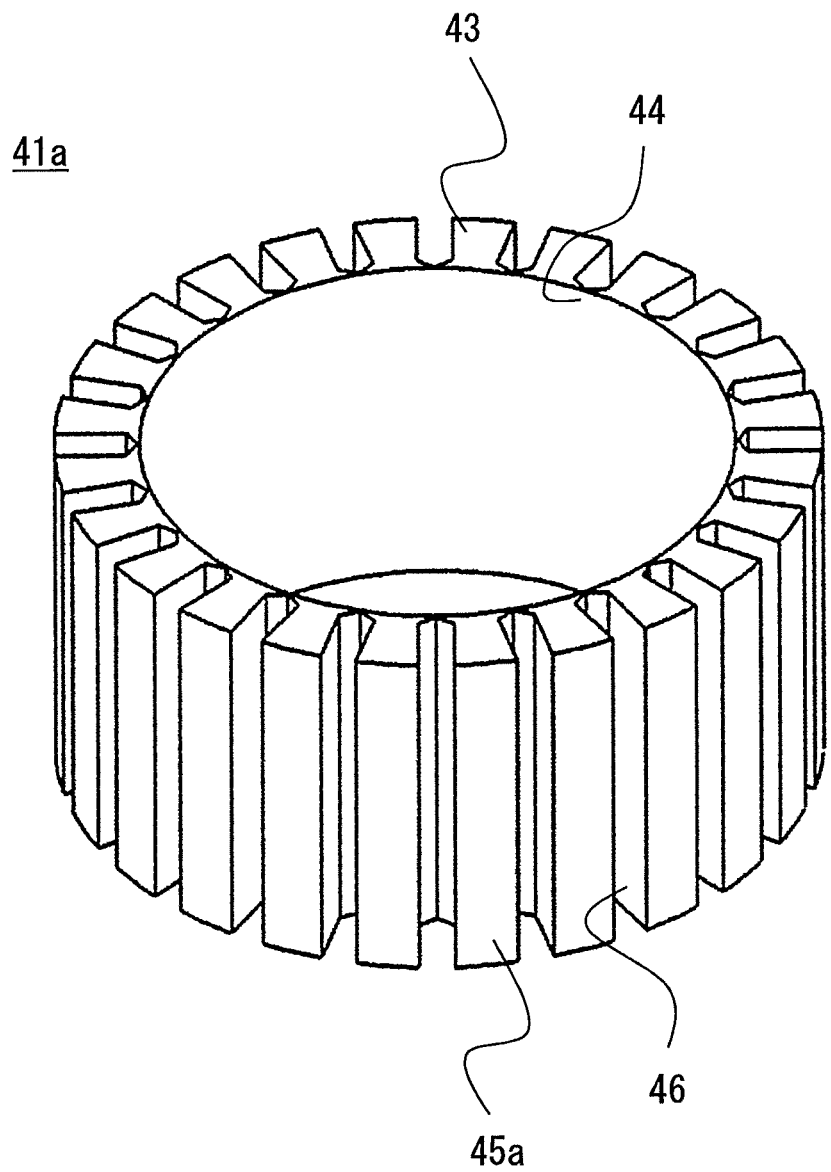
FIG. 4 is a perspective view of an inner core of the stator according to Embodiment 1 of the present invention.

FIG. 4 is a perspective view of an inner core 41a of the stator 40.

Figure 5:
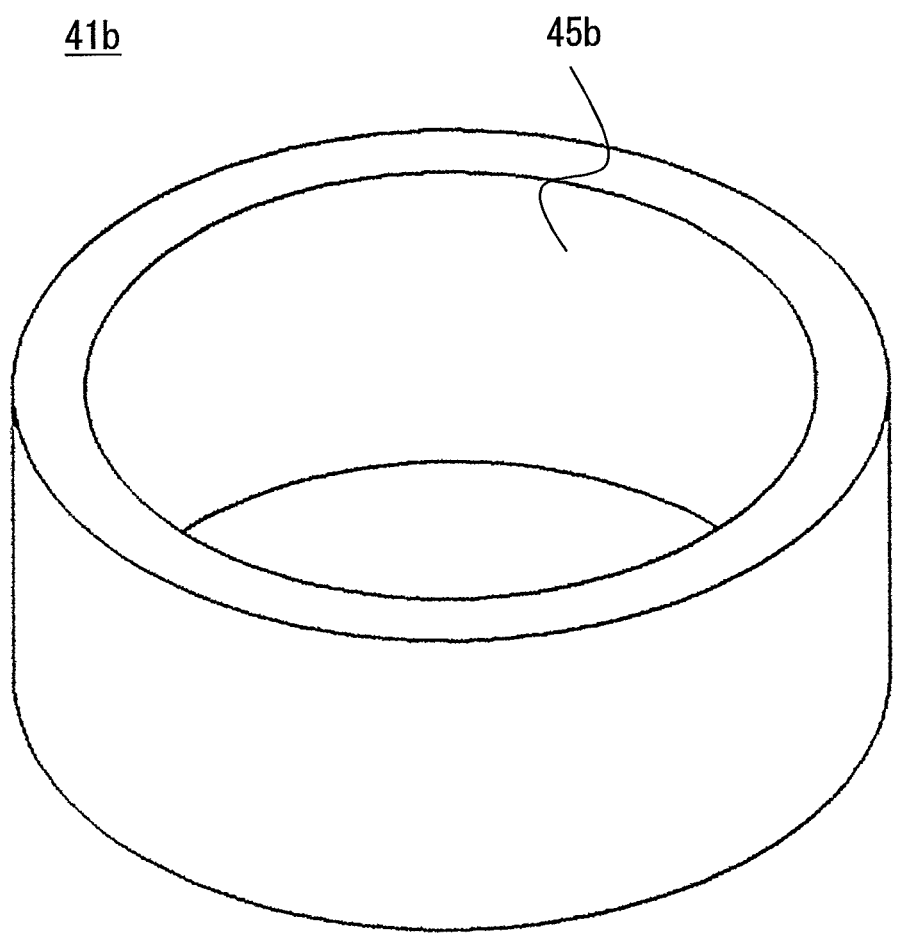
FIG. 5 is a perspective view of an outer core of the stator according to Embodiment 1 of the present invention.

FIG. 5 is a perspective view of an outer core 41b of the stator 40.

As shown in the respective drawings, the stator 40 includes a stator core 41, coils 20 mounted on the stator core 41, and slot cells 42a that electrically insulate the coils 20 and the stator core 41 from each other. Here, for convenience of explanation, the number of poles of the rotor 30 is four, the number of slots 46 of the stator core 41 is 24, and the coils 20 are three-phase windings. That is, the slots 46 are formed in the stator core 41 at a ratio of two slots per pole.

The stator core 41 includes the inner core 41a and the outer core 41b. As shown in FIG. 4, in the inner core 41a, a plurality of tooth portions 43 forming magnetic poles are arranged in a circular ring shape such that ends thereof at the inner peripheral side are connected to each other by a thin portion 44. The slot 46 is formed between the tooth portions 43 adjacent to each other. The outer core 41b shown in FIG. 5 is a back yoke portion that magnetically connects each tooth portion 43 of the inner core 41a. The inner core 41a is fitted to the inner side of the outer core 41b, whereby the outer peripheral surfaces 45a of the inner core 41a and the inner peripheral surface 45b of the outer core 41b are magnetically connected to each other.

Figure 6:
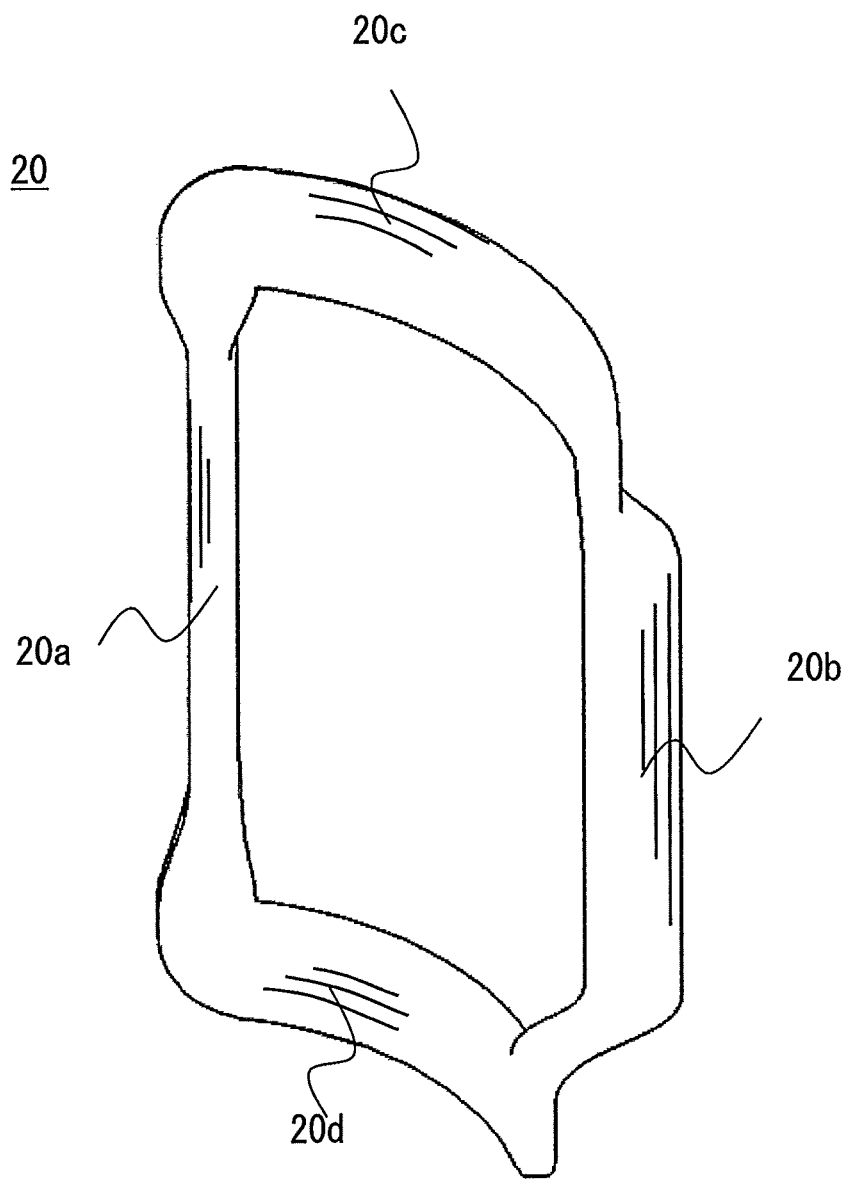
FIG. 6 is a perspective view of a coil used in the stator according to Embodiment 1 of the present invention.

FIG. 6 is a perspective view of the coil 20 used in the stator 40.

Figure 7:
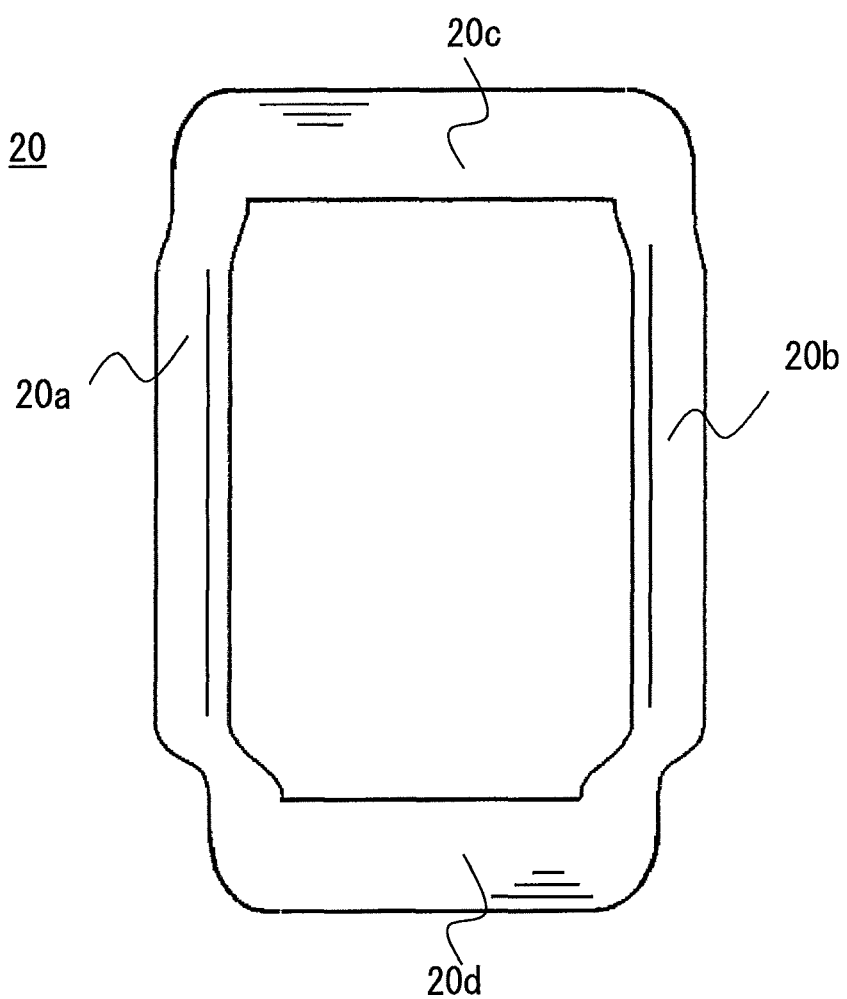
FIG. 7 is a front view of the coil used in the stator according to Embodiment 1 of the present invention.

FIG. 7 is a front view of the coil 20.

Figure 8:
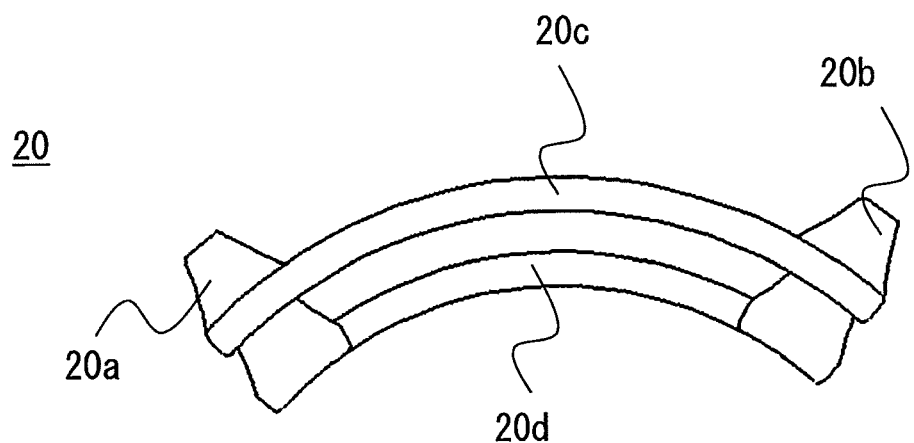
FIG. 8 is a plan view of the coil used in the stator according to Embodiment 1 of the present invention.

FIG. 8 is a plan view of the coil 20.

As shown in FIGS. 6 to 8, the coil 20 includes: a first slot received portion 20a and a second slot received portion 20b (hereinafter, referred to merely as slot received portions 20a and 20b) that are to be inserted into the slots 46 of the stator core 41; and a bridge portion 20c at an opened side and a bridge portion 20d at a closed side each of which connects ends of the slot received portion 20a and the slot received portion 20b to each other and extends over the multiple tooth portions 43. The "opened side" refers to a side at which the frame 11 is opened, and the "closed side" refers to a side opposite to the opened side.

The coil 20 is produced by winding, a plurality of times, for example, a conductor wire made of copper or aluminum that is insulated and coated with an enamel resin and is continuous without any joint. The bridge portions 20c and 20d are made thinner in thickness in the radial direction than the slot received portions 20a and 20b, in order to avoid interference at a coil end portion with the coil 20 that forms another phase. As shown in FIG. 8, the bridge portion 20d at the closed side is located radially inward of the bridge portion 20c at the opened side. When the coil 20 is inserted into the slots 46, the bridge portion 20d at the closed side is located inward of the thin portion 44 of the inner core 41a.

Next, a production method for the rotating electrical machine 100 will be described.

Figure 9:
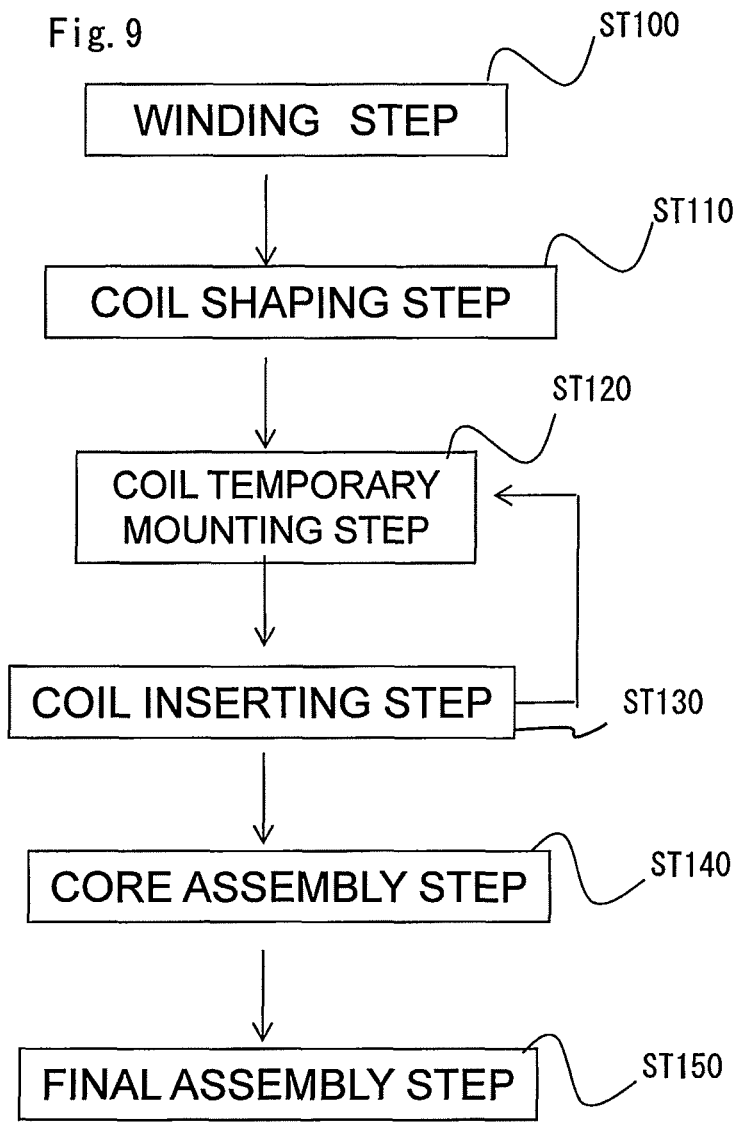
FIG. 9 is a flowchart showing a production process for the rotating electrical machine according to Embodiment 1 of the present invention.

FIG. 9 is a flowchart showing a production process for the rotating electrical machine 100.

As shown in the drawing, the rotating electrical machine 100 is completed through a winding step ST100, a coil shaping step ST110, a coil temporary mounting step ST120, a coil inserting step ST130, a core assembly step ST140, and a final assembly step ST150.

First, the winding step ST100 will be described.

Figure 10:
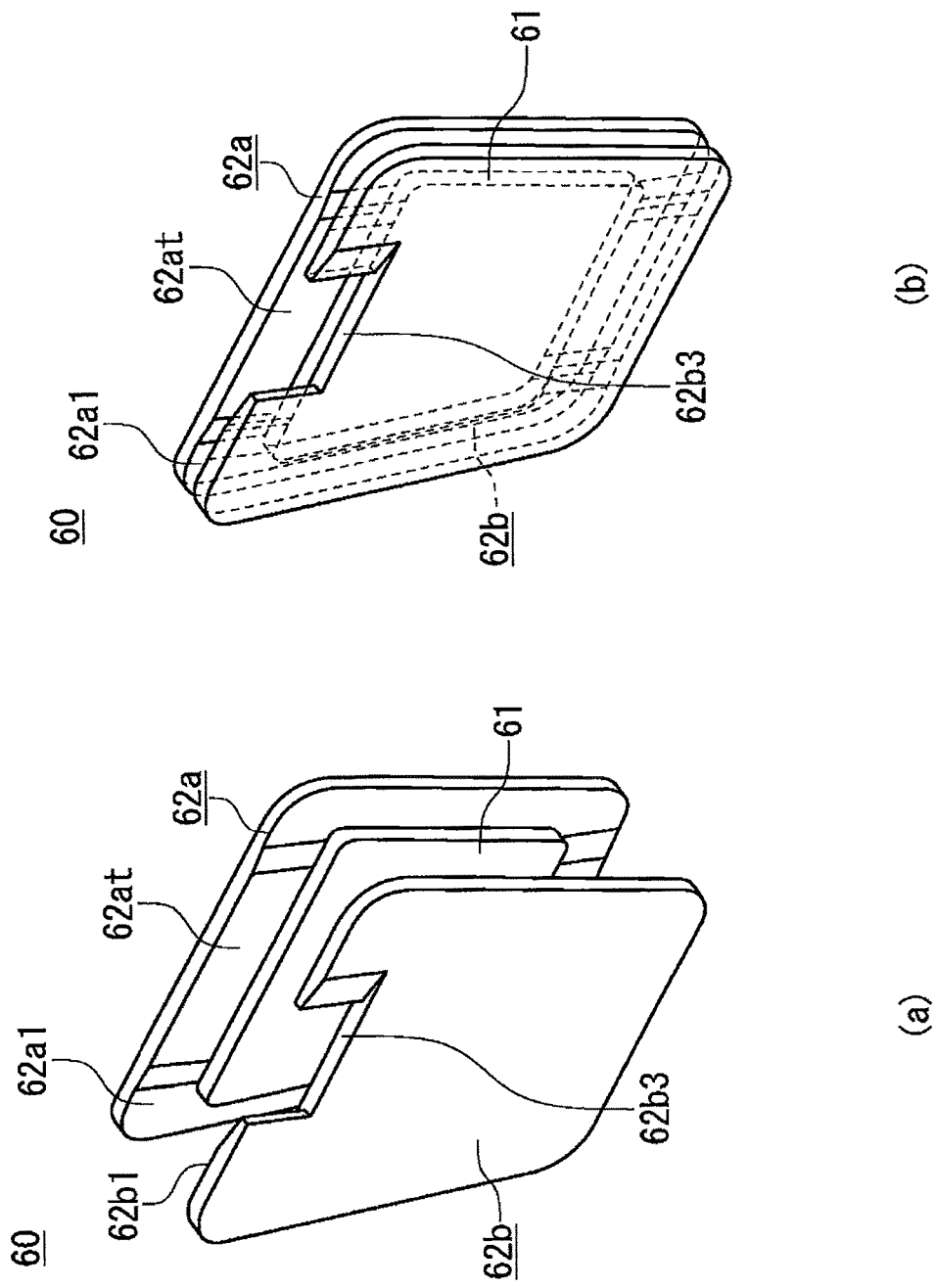
FIG. 10 is a perspective view of a winding frame used in a winding step according to Embodiment 1 of the present invention.

FIG. 10(a) is an exploded perspective view of a winding frame 60 used in the winding step ST100.

FIG. 10(b) is a perspective view after assembly of the winding frame 60 used in the winding step ST100.

Figure 11:
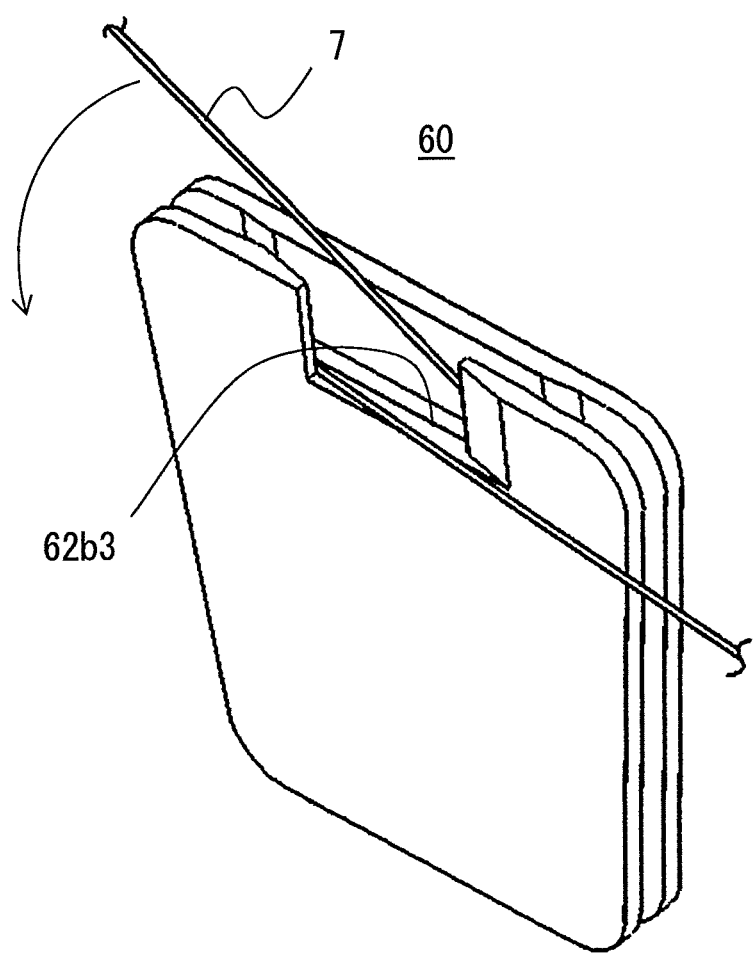
FIG. 11 is a diagram showing the winding step according to Embodiment 1 of the present invention.

FIG. 11 is a diagram showing the winding step ST100.

Figure 12:
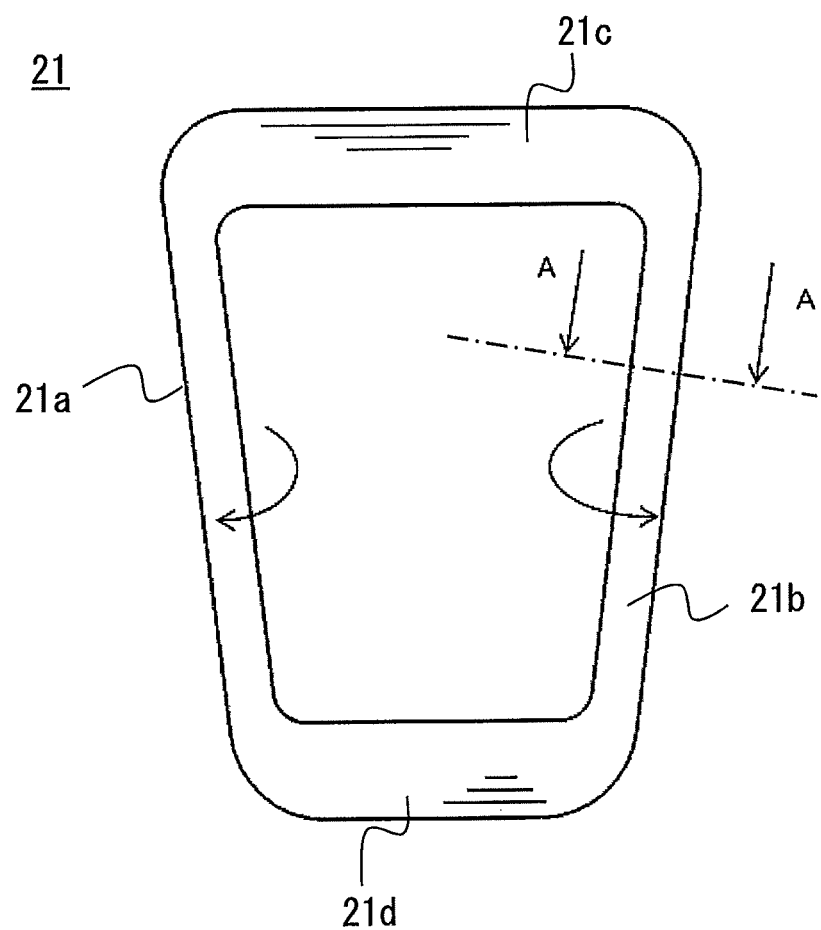
FIG. 12 is a front view of an intermediate coil taken out from the winding frame after end of the winding step according to Embodiment 1 of the present invention.

FIG. 12 is a front view of a hollow flat plate-shaped intermediate coil 21 taken out from the winding frame 60 after end of the winding step ST100.

Figure 13:
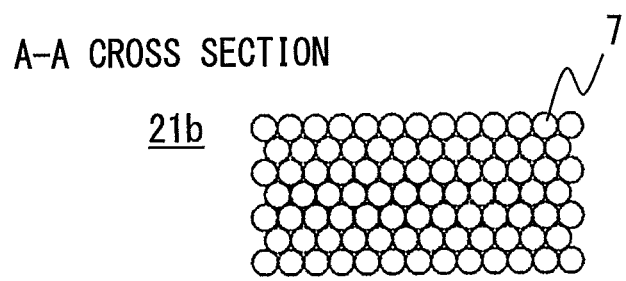
FIG. 13 is a cross-sectional view taken along a line A-A shown in FIG. 12.

FIG. 13 is a cross-sectional view taken along a line A-A shown in FIG. 12.

The intermediate coil 21 is a coil before the slot received portions 20a and 20b and the bridge portions 20c and 20d of the coil 20 are shaped. The winding frame 60 includes: a winding core 61 having an outer periphery on which the intermediate coil 21 is to be wound; and side plates 62a and 62b that sandwich the winding core 61 from both side surface sides thereof. These members can be disassembled such that the wound intermediate coil 21 can be taken out.

The bridge portions 20c and 20d of the coil 20 need to be formed so as to be thinner in the radial direction than the slot received portions 20a and 20b. Thus, a projection 62 at that restricts a winding width is provided on the inner surface 62a1 of the side plate 62a. Although not seen in FIG. 10, the lower half of the side plate 62b also has the same shape as that of the side plate 62a. A conductor wire 7 is introduced into the winding frame 60 through an introduction portion 62b3 provided in the center of an upper portion of the side plate 62b as shown in FIG. 11, and is wound in the direction of an arrow shown in FIG. 11, to perform winding of the intermediate coil 21. As shown in FIG. 13, by using the winding frame 60, the conductor wire 7 forming the intermediate coil 21 can be wound so as to be regularly aligned.

Next, the coil shaping step ST110 will be described with reference to FIGS. 12 to 16.

Figure 14:
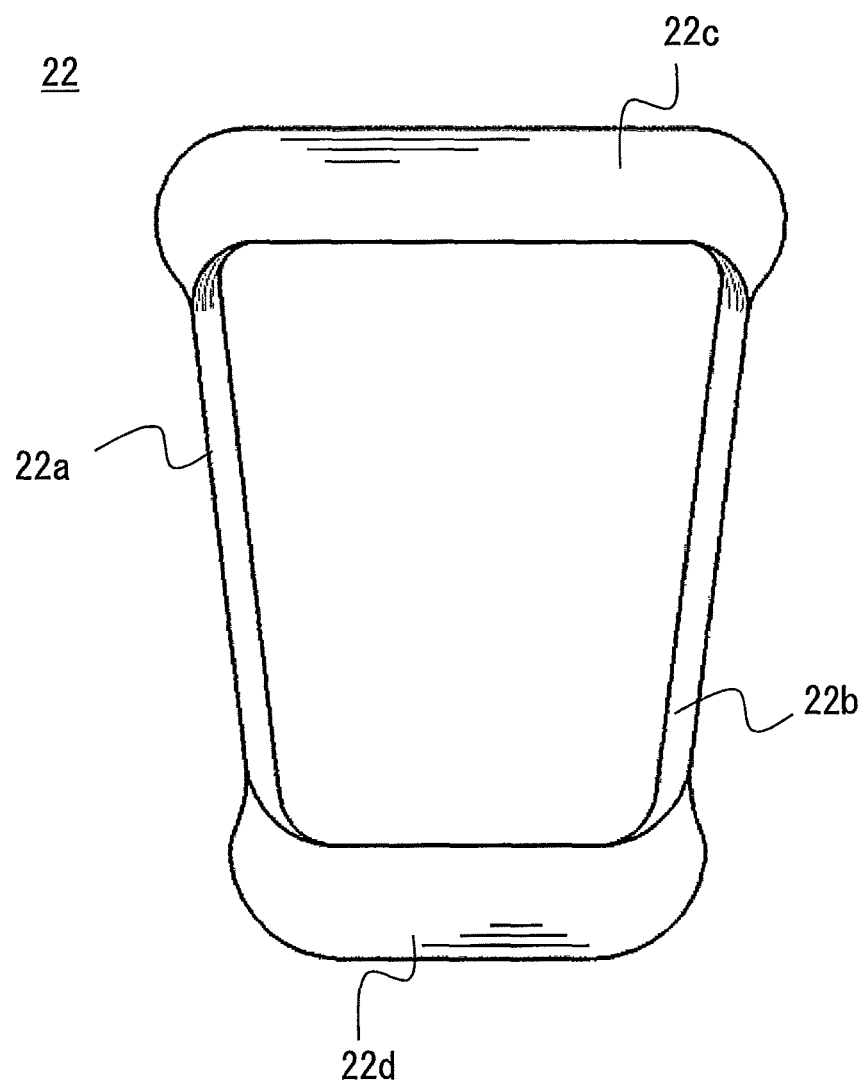
FIG. 14 is a front view of a twisted intermediate coil according to Embodiment 1 of the present invention.

FIG. 14 is a front view of a twisted intermediate coil 22.

First, slot received portions 21a and 21b of the intermediate coil 21 shown in FIG. 12 are twisted in the directions of arrows in FIG. 12 to obtain the twisted intermediate coil 22 shown in FIG. 14.

Figure 15:
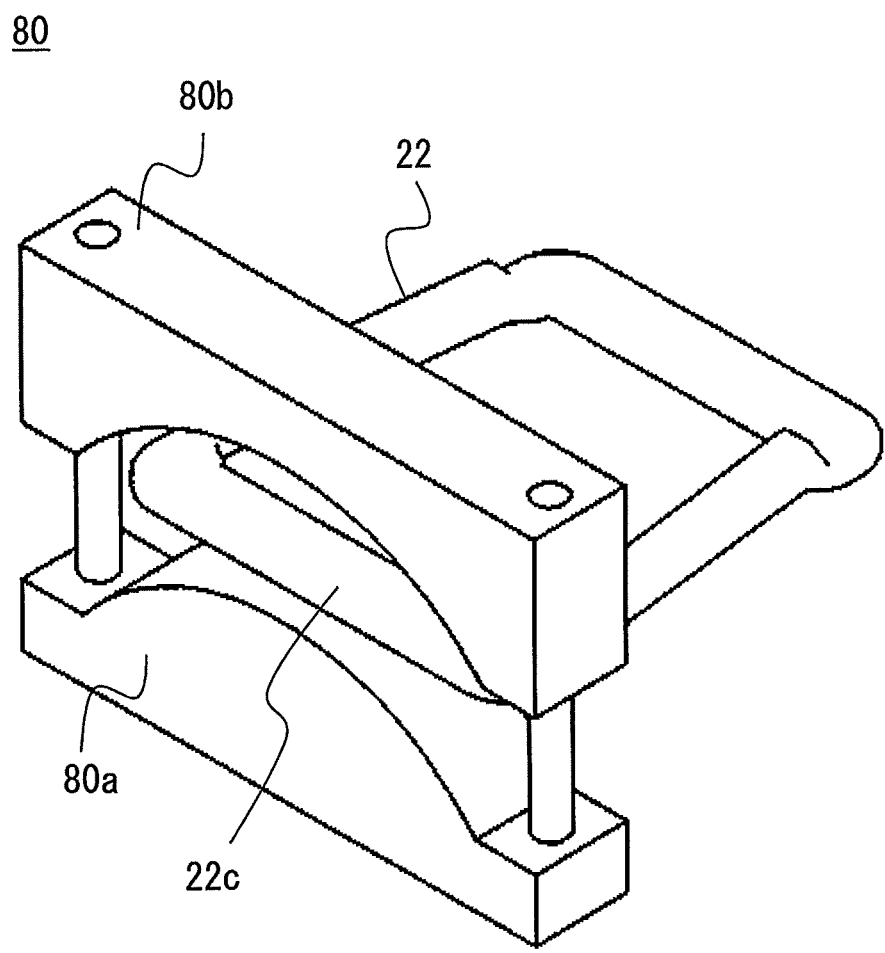
FIG. 15 is a perspective view showing a state where the twisted intermediate coil is set on a bridge portion shaping mold according to Embodiment 1 of the present invention.
Figure 16:
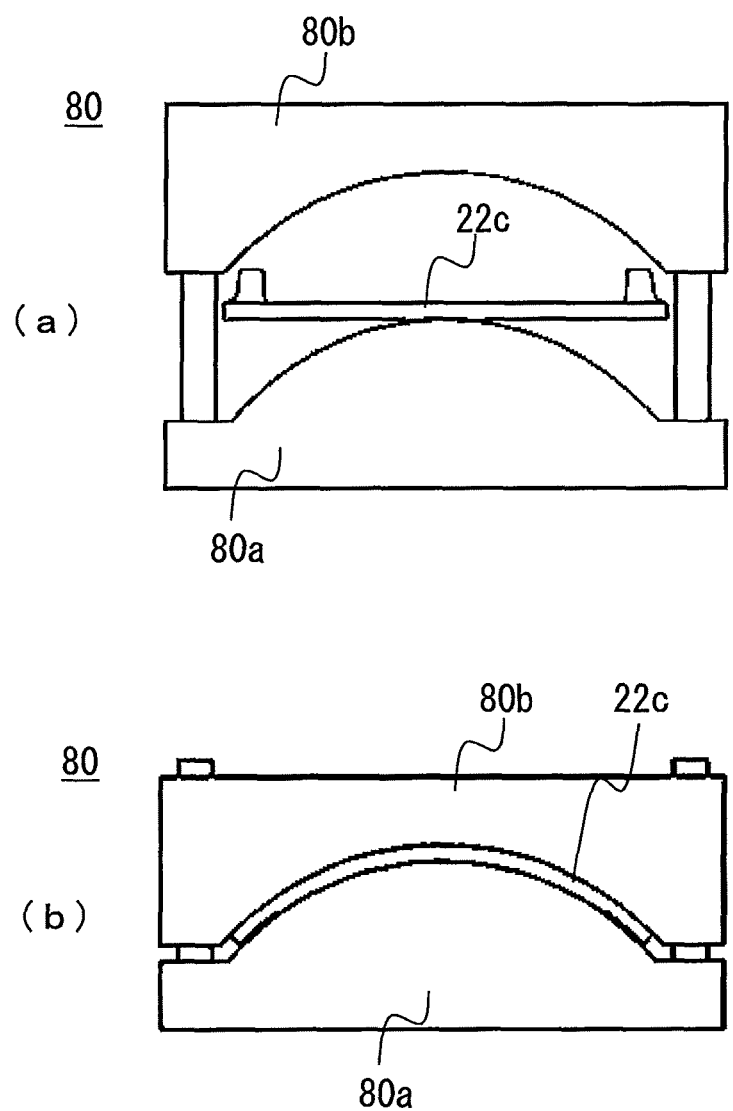
FIG. 16 is a diagram showing states before and after a bridge portion of the twisted intermediate coil is shaped by the bridge portion shaping mold according to Embodiment 1 of the present invention.

FIG. 15 is a perspective view showing a state where the twisted intermediate coil 22 is set on a bridge portion shaping mold 80.

FIG. 16(a) is a front view of a state where the twisted intermediate coil 22 is set on the bridge portion shaping mold 80.

FIG. 16(b) is a front view of a state where a bridge portion 22c of the twisted intermediate coil 22 is shaped by the bridge portion shaping mold 80.

The bridge portion shaping mold 80 includes a convex mold 80a and a concave mold 80b. The bridge portions 22c and 22d of the twisted intermediate coil 22 are shaped by the convex mold 80a and the concave mold 80b so as to have a circular arc shape with a center of curvature located on the axis of the stator 40. Although not shown, by using different bridge portion shaping molds for the bridge portion 22c and for the bridge portion 22d, the twisted intermediate coil 22 is shaped such that the bridge portion 20d of the completed coil 20 is located radially inward of the bridge portion 20c of the completed coil 20 as shown in FIG. 8.

Next, the coil temporary mounting step ST120 and the coil inserting step ST130 will be described with reference to FIGS. 17 to 31.

Figure 17:
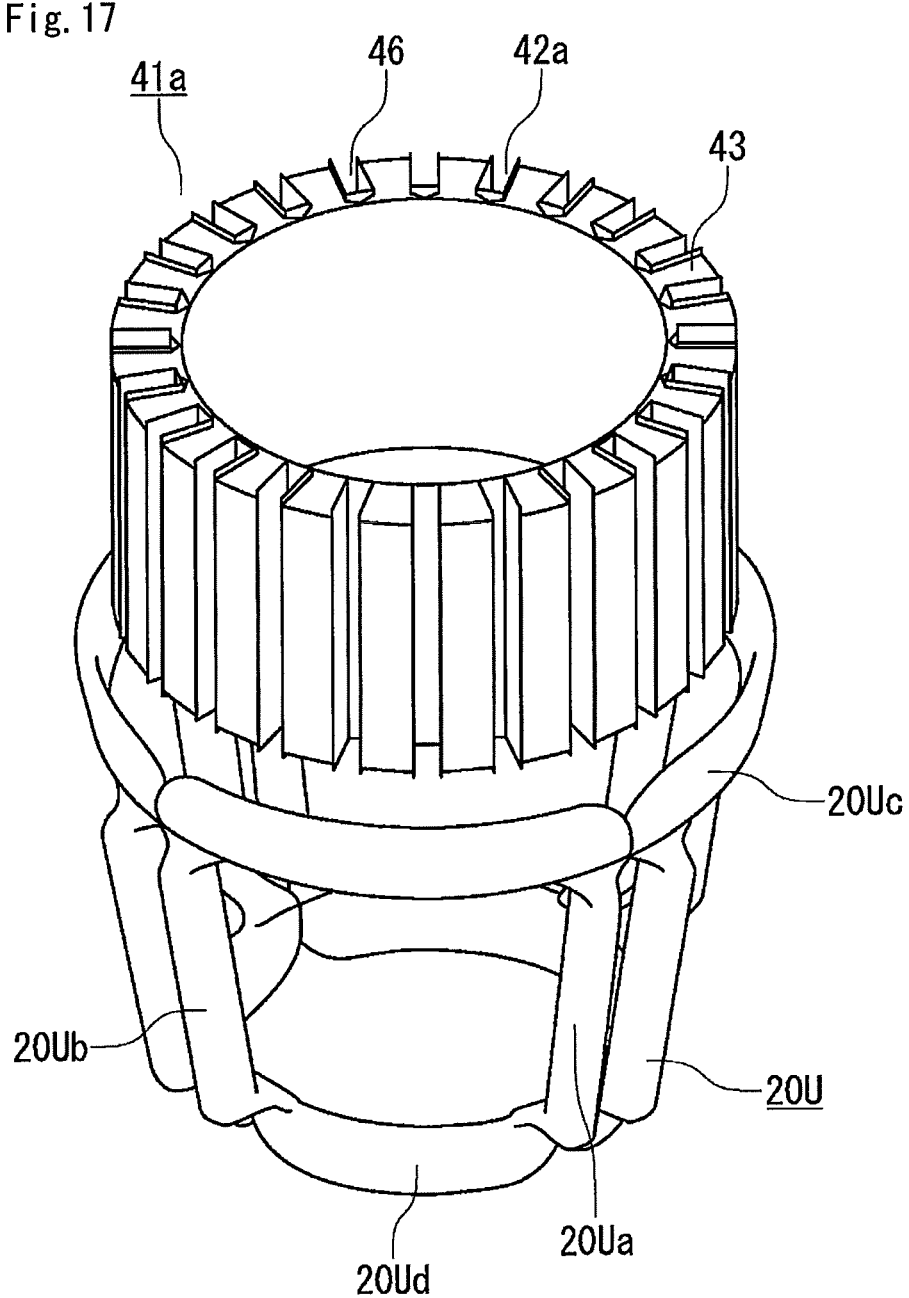
FIG. 17 is a perspective view of the inner core and U-phase coils in a coil temporary mounting step according to Embodiment 1 of the present invention.
Figure 18:
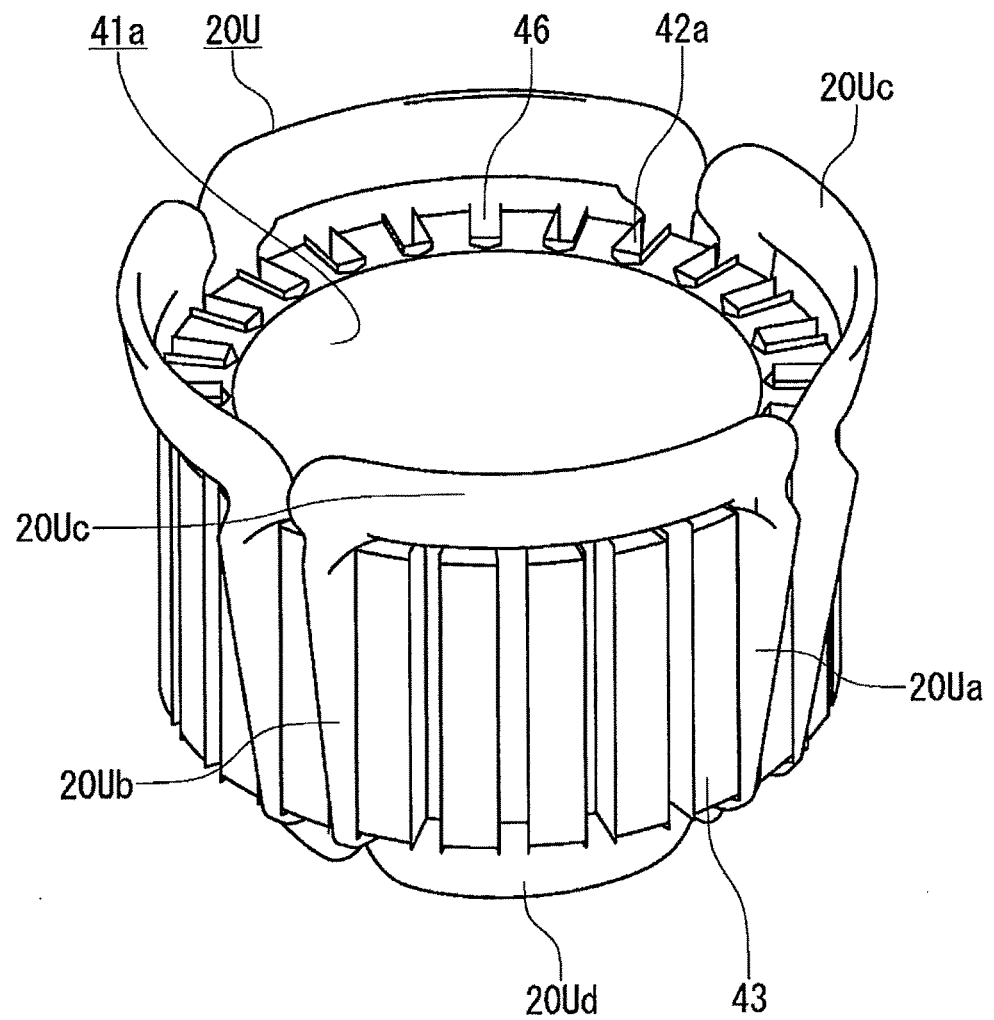
FIG. 18 is a perspective view of the inner core and the U-phase coils in the coil temporary mounting step according to Embodiment 1 of the present invention.

FIGS. 17 and 18 are perspective views of the inner core 41a and coils 20U in the coil temporary mounting step ST120.

Figure 19:
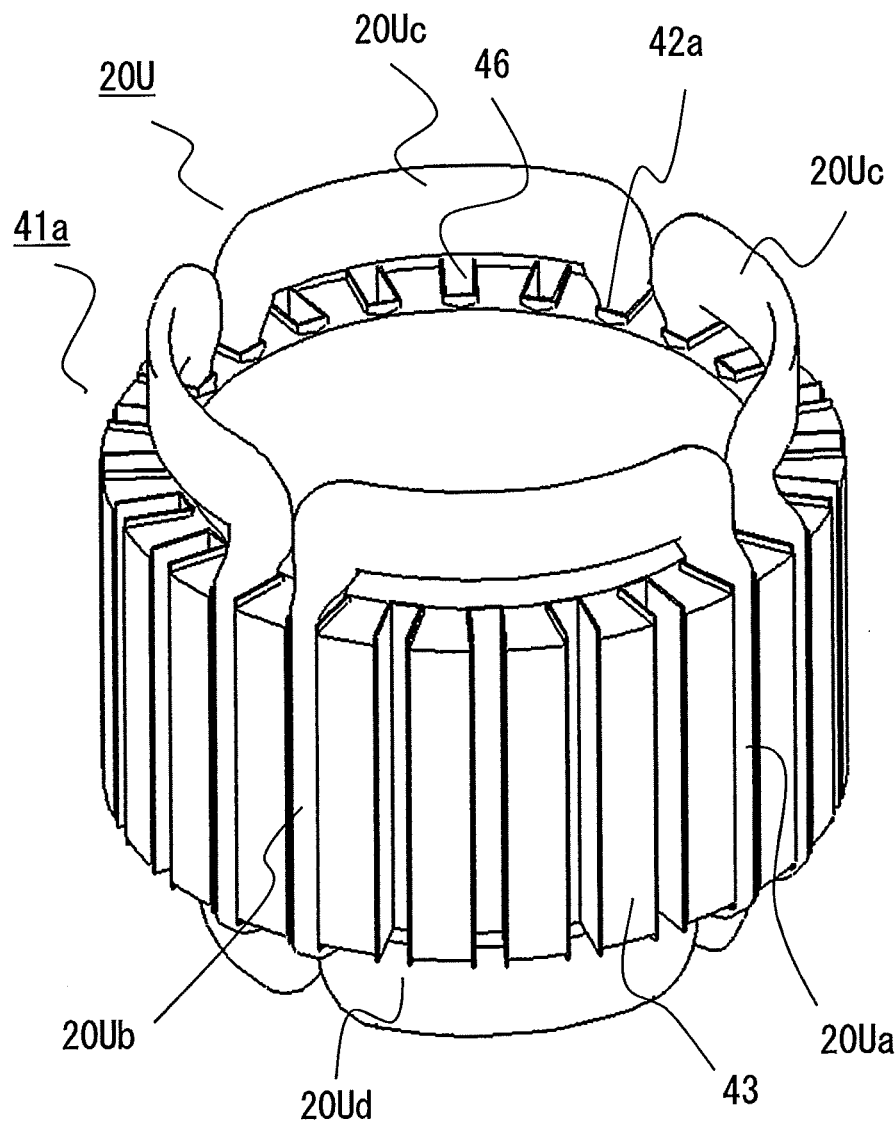
FIG. 19 is a perspective view showing a state of the inner core and the U-phase coils after end of the coil inserting step for U-phase according to Embodiment 1 of the present invention.
Figure 20:
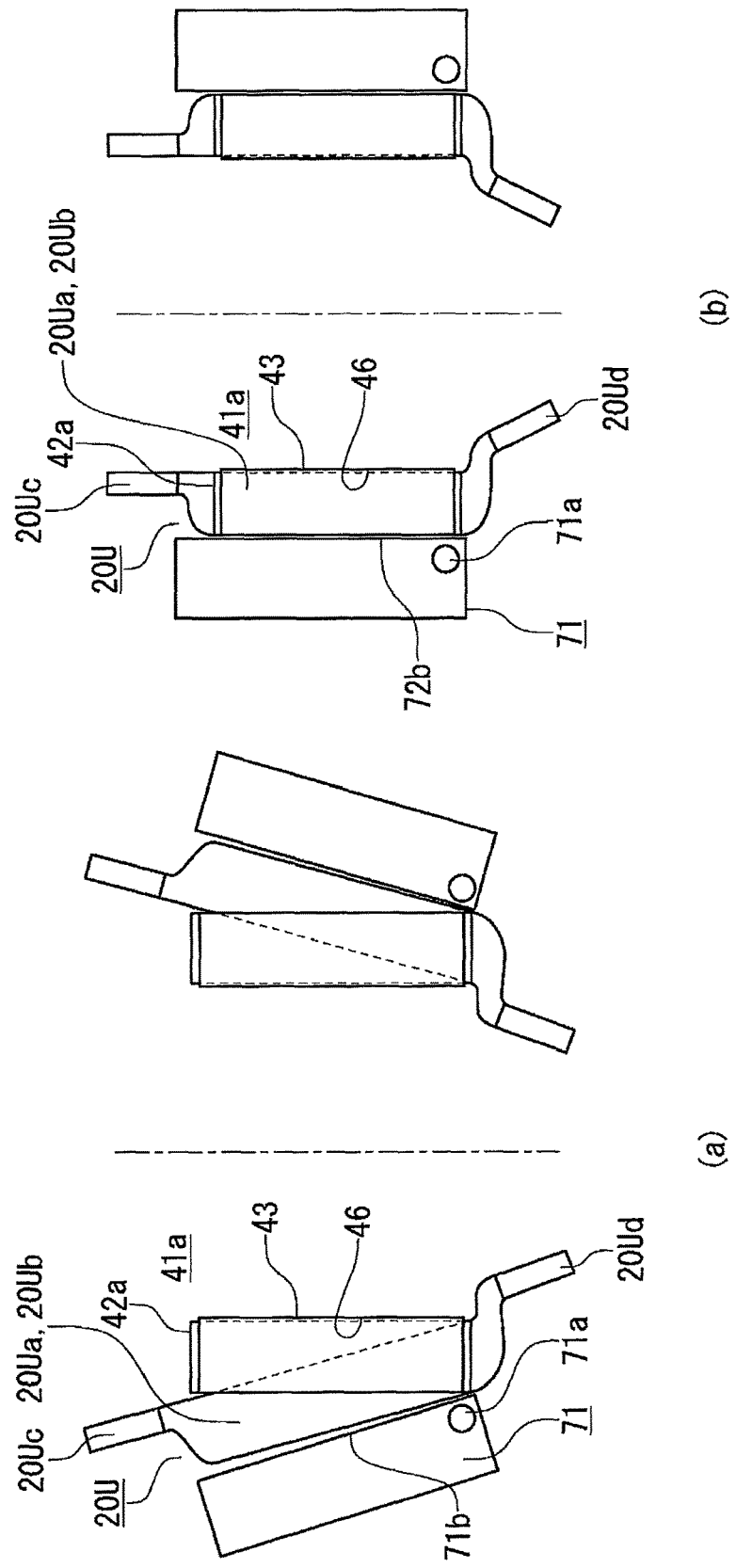
FIG. 20 is a diagram showing a coil inserting method using a jig according to Embodiment 1 of the present invention.

FIG. 19 is a perspective view showing a state of the inner core 41a and the U-phase coils 20U after end of the coil inserting step ST130 for U-phase.

In the coil temporary mounting step ST120, the slot cells 42a that insulate the respective tooth portions 43 and the coils 20 (coils 20U, 20V, and 20W) from each other are mounted along inner wall surfaces of the slots 46 of the inner core 41a, and, first, the coils 20U forming U-phase are inserted obliquely into the corresponding slots 46 such that bridge portions 20Uc thereof at the opened side initially enter therein as shown in FIG. 17, and are temporarily mounted on the inner core 41a to obtain a state in FIG. 18.

Next, as shown in FIG. 19, in the coil inserting step ST130, the bridge portions 20Uc at the opened side are closed so as to be reduced in diameter, so that slot received portions 20Ua and 20Ub of each coil 20U are fully inserted into the slots 46.

FIGS. 20(a) and 20(b) are diagrams showing a method for inserting the coil 20U by using a rotary plate jig 71.

FIG. 20(a) shows a state of the coil 20U after end of the coil temporary mounting step ST120, and FIG. 20(b) shows a state of the coil 20U after end of the coil inserting step ST130. Each figure is a cross-sectional schematic diagram centered at the axis of the inner core 41a. The rotary plate jig 71 has a rotation center 71a at the radially outer side of each of the ends of the slot received portions 20Ua and 20Ub at the closed side. In the coil inserting step ST130, a pressing portion 71b of the rotary plate jig 71 presses each of the slot received portions 20Ua and 20Ub of the coil 20U temporarily mounted obliquely in the slots 46, into the slots 46 from the outer peripheral side while rotating about the rotation center 71a such that the slot received portions 20Ua and 20Ub gradually become parallel to the axial direction.

FIGS. 21(a) and 21(b) are diagrams showing a method for inserting the coil 20U by using a roller jig 72 different from the rotary plate jig 71.

FIG. 21(a) shows a state of the coil 20U after end of the coil temporary mounting step ST120, and FIG. 21(b) shows a state of the coil 20U after end of the coil inserting step ST130. Each figure is a cross-sectional schematic diagram centered at the axis of the inner core 41a.

Figure 21:
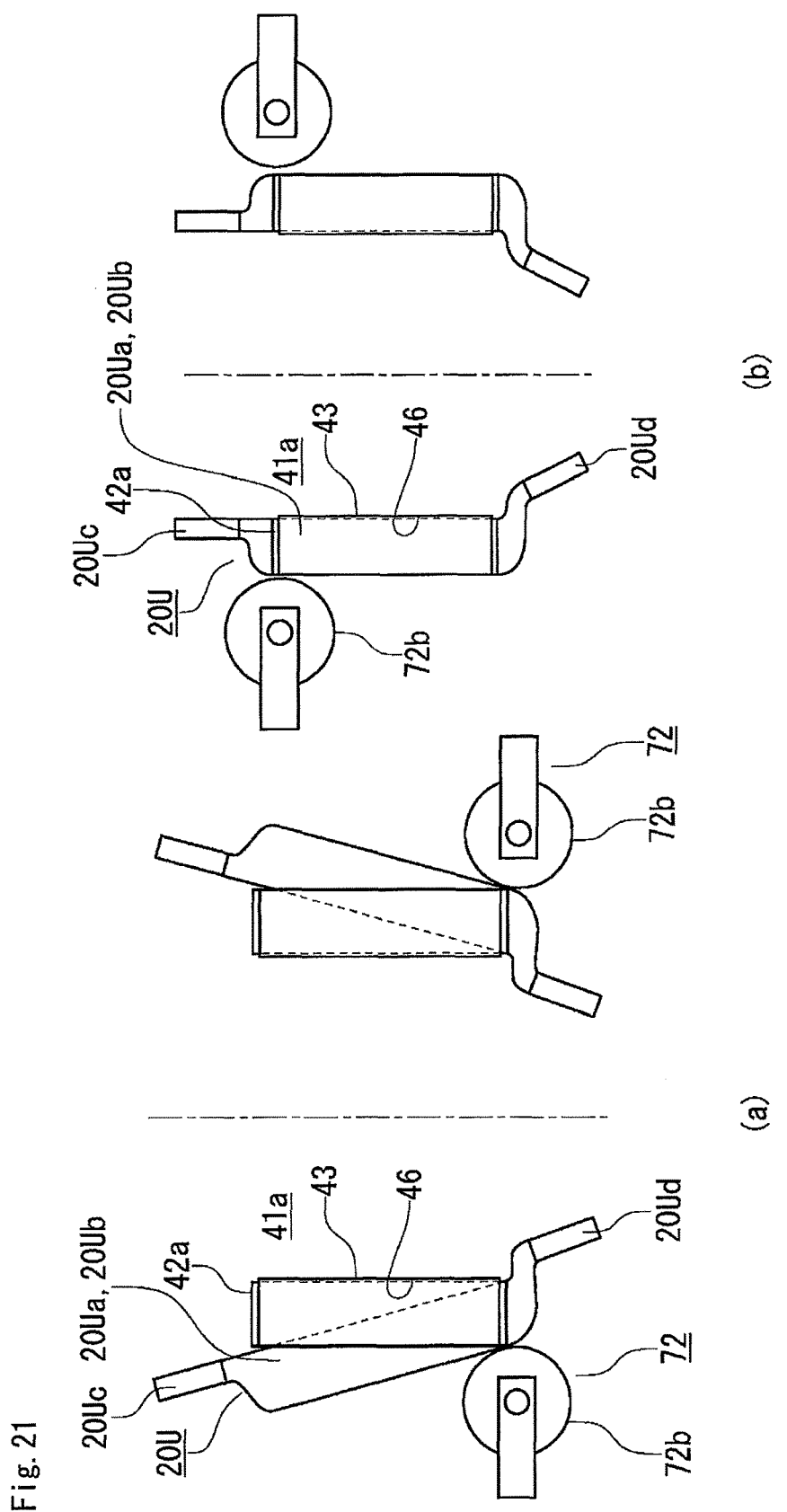
FIG. 21 is a diagram showing a coil inserting method using a jig according to Embodiment 1 of the present invention.
Figure 22:
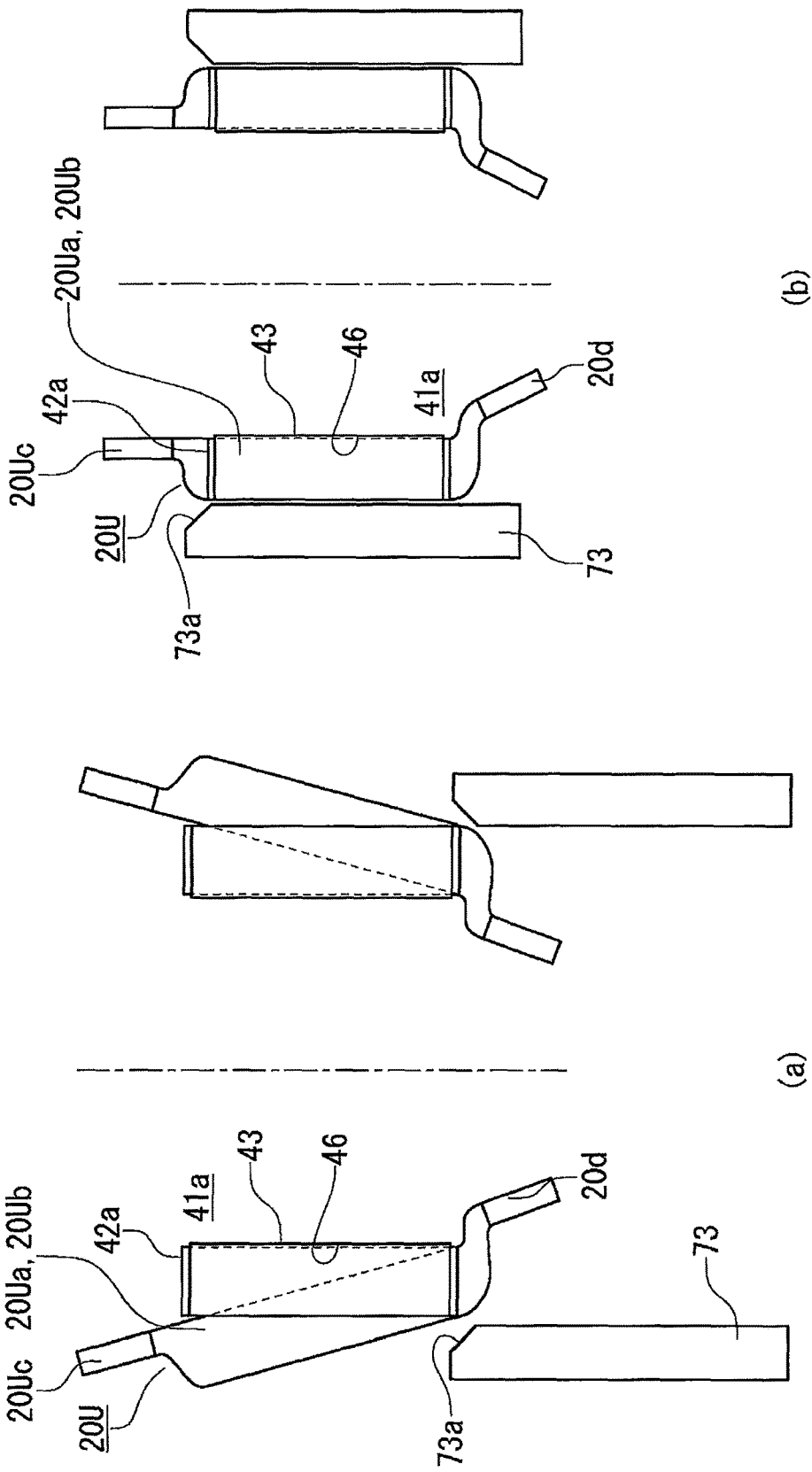
FIG. 22 is a diagram showing a coil inserting method using a jig according to Embodiment 1 of the present invention.

As shown in FIG. 21, in the coil inserting step ST130, the slot received portions 20Ua and 20Ub of the coil 20U temporarily mounted in the slots 46 may be pressed from the ends thereof at the closed side toward the ends thereof at the opened side by using rollers 72b of the roller jig 72.

FIGS. 22(a) and 22(b) are diagrams showing a method for inserting the coil 20U by using a slide jig 73 different from the rotary plate jig 71 and the roller jig 72.

FIG. 22(a) shows a state of the coil 20U after end of the coil temporary mounting step ST120, and FIG. 22(b) shows a state of the coil 20U after end of the coil inserting step ST130. Each figure is a cross-sectional schematic diagram centered at the axis of the inner core 41a.

The slide jig 73 has a cylinder shape having an inner diameter substantially equal to the outer diameter of the inner core 41a. The inner core 41a subjected to the coil temporary mounting step ST120 is fully inserted into the slide jig 73 while being slid on the inner side of the slide jig 73 from the closed-side end side. The upper edge of the inner peripheral surface of the slide jig 73 is provided with a chamfered portion 73a for easily inserting the inner core 41a.

Figure 23:
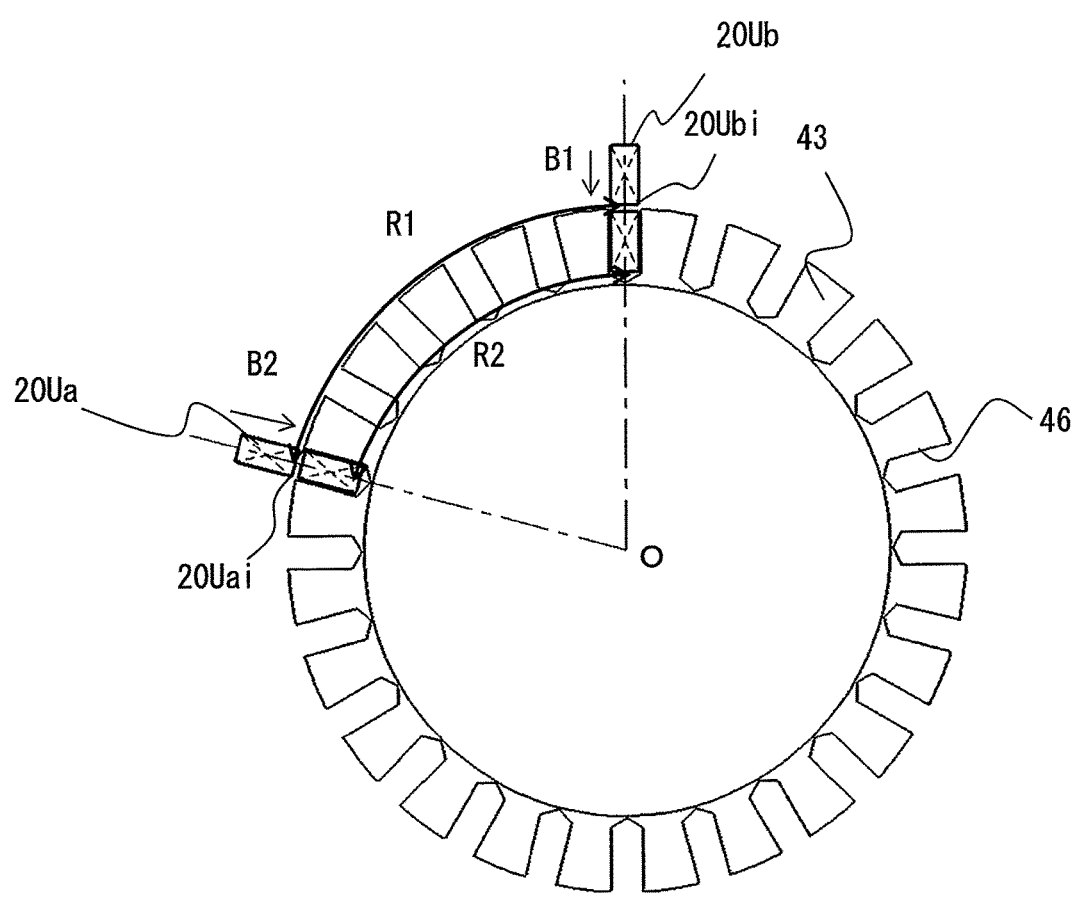
FIG. 23 is a diagram showing a diameter-reduced state of slot received portions of the coil before and after the coil inserting step according to Embodiment 1 of the present invention.

FIG. 23 is a diagram showing a diameter-reduced state of the slot received portions 20Ua and 20Ub of the coil 20U before and after the coil inserting step ST130.

Figure 24:
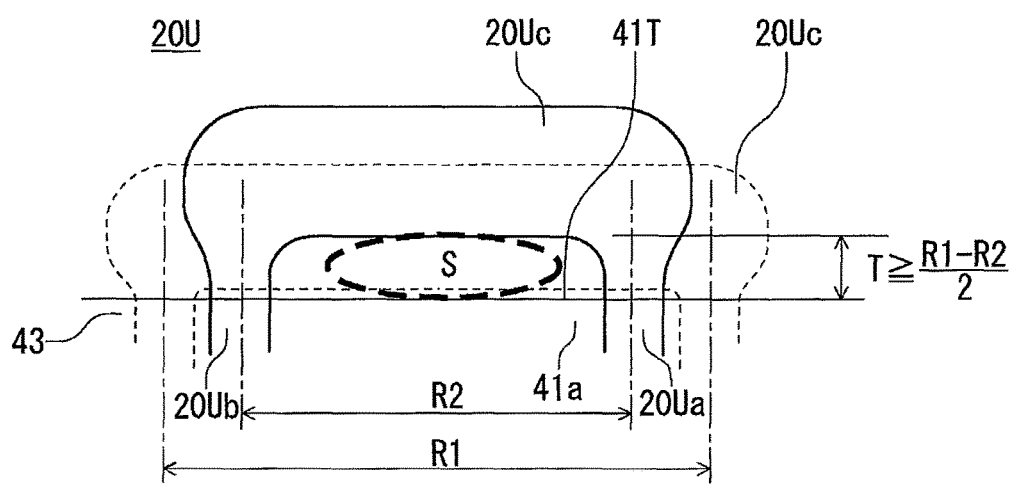
FIG. 24 is a diagram showing a state where a rising state of a bridge portion at an opened side before and after the coil inserting step according to Embodiment 1 of the present invention.

FIG. 24 is a diagram showing a rising state of the bridge portion 20Uc at the opened side before and after the coil inserting step ST130. The bridge portion 20Uc has a substantially rectangular shape as seen from the axis of the stator. When the slot received portions 20Ua and 20Ub of the coil 20U are fully received into the slots 46 by using any one of the jigs, the positions of the two slot received portions 20a and 20b move to the inner peripheral side shown by arrows B1 and B2 as shown in FIG. 23, so that the length of a circular arc that connects inner peripheral side ends 20Uai and 20Ubi of the slot received portions 20Ua and 20Ub and has a center on an axis O decreases from R1 to R2. Here, the length R1 of the circular arc is also the length of a circular arc that has a center on the axis O of the stator 40, is between straight lines passing through the centers of the two slots 46 in which the coil 20U is inserted, and has a radius at the outermost position of the tooth portion 43. In addition, R2 is also the length of a circular arc that has a center on the axis O of the stator 40, is between the straight lines passing through the centers of the two slots 46 in which the coil 20U is inserted, and has a radius at the innermost position of the tooth portion 43. In FIG. 24 and later-described FIGS. 25, R1 and R2 indicate the lengths of the circular arcs.

When the slot received portions 20U*a* and 20U*b* of the coil 20U are fully inserted into the slots 46, the bridge portion 20U*c* at the opened side rises at the same time as shown in FIG. 24, so that a gap S can be formed between an end surface 41T of the inner core 41*a* in the axial direction and the bridge portion 20U*c*. The gap S ensures a space for avoiding interference with the bridge portion of another coil, and serves as a flow path for refrigerant to contribute to improvement in the cooling performance of the rotating electrical machine 100.

The dimension of a height T of the gap S at this time is (R1−R2)/2. The formation of the gap S allows the coil inserting step ST130 to be smoothly performed. Meanwhile, in order to actually arrange the coils 20U around the inner core 41*a*, each coil 20U is located slightly outward of the position of R1 in FIG. 23, and thus T≥(R1−R2)/2 is satisfied. However, if the value of T is excessively increased, the peripheral length of the coil 20U increases, leading to an increase in a resistance value and an increase in the entire size of a motor. Thus, the dimension is set within a range of up to approximately 5%, and T<((R1−R2)/2)×1.05 is desirably satisfied.

Figure 25:
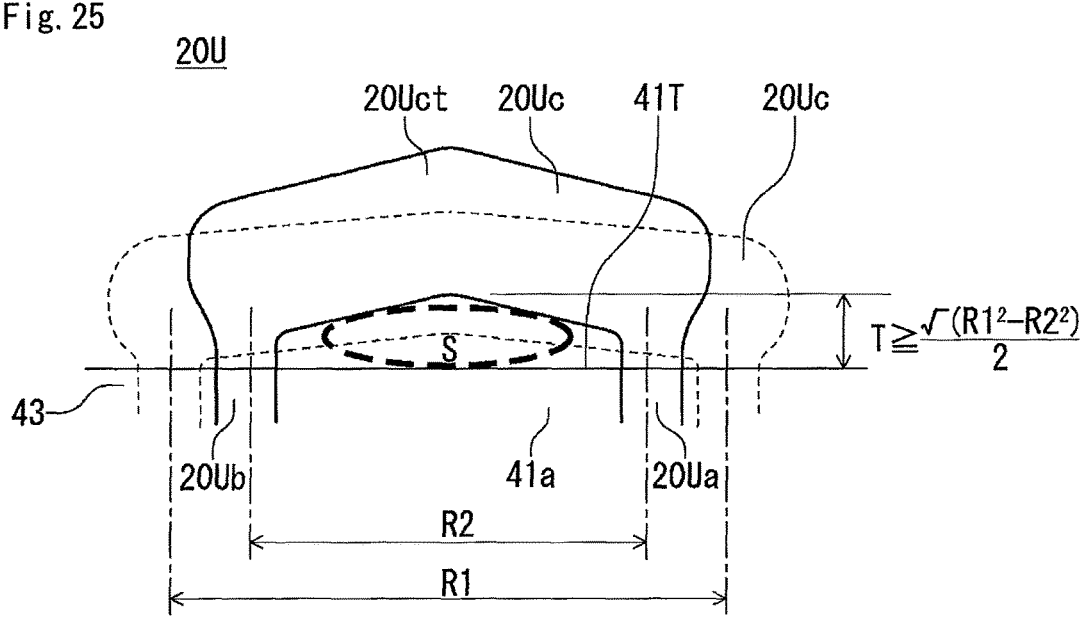
FIG. 25 is a diagram showing a relationship among R1, R2, and T in the case where a coil having an apex in a bridge portion is used.

FIG. 25 is a diagram showing a relationship among R1, R2, and T in the case where a coil 20U having an apex 20U*ct* in a bridge portion 20U*c* is used. The bridge portion 20U*c* has a substantially triangular shape as seen from the axis of the stator. In the case of the coil 20U in which a central portion of the bridge portion 20U*c* in the circumferential direction projects in the axial direction, T can be defined as the "height" of a pseudo isosceles triangle, and can be calculated according to the Pythagorean theorem on the basis of a right triangle that is a half of the isosceles triangle. That is, since the bridge portion 20U*c* having ½ of R1 rises to be the hypotenuse, the base has ½ of R2, and the height is T, $T=\sqrt{(R1^2-R2^2)}/2$ is satisfied based on $T^2=(R1/2)^2-(R2/2)^2$. When the above allowance is taken into consideration, $T\geq\sqrt{(R1^2-R2^2)}/2$ and $T<(\sqrt{(R1^2-R2^2)}/2)\times1.05$ are satisfied. Even with such a coil, the coil inserting step ST130 can be smoothly performed.

Figure 26:
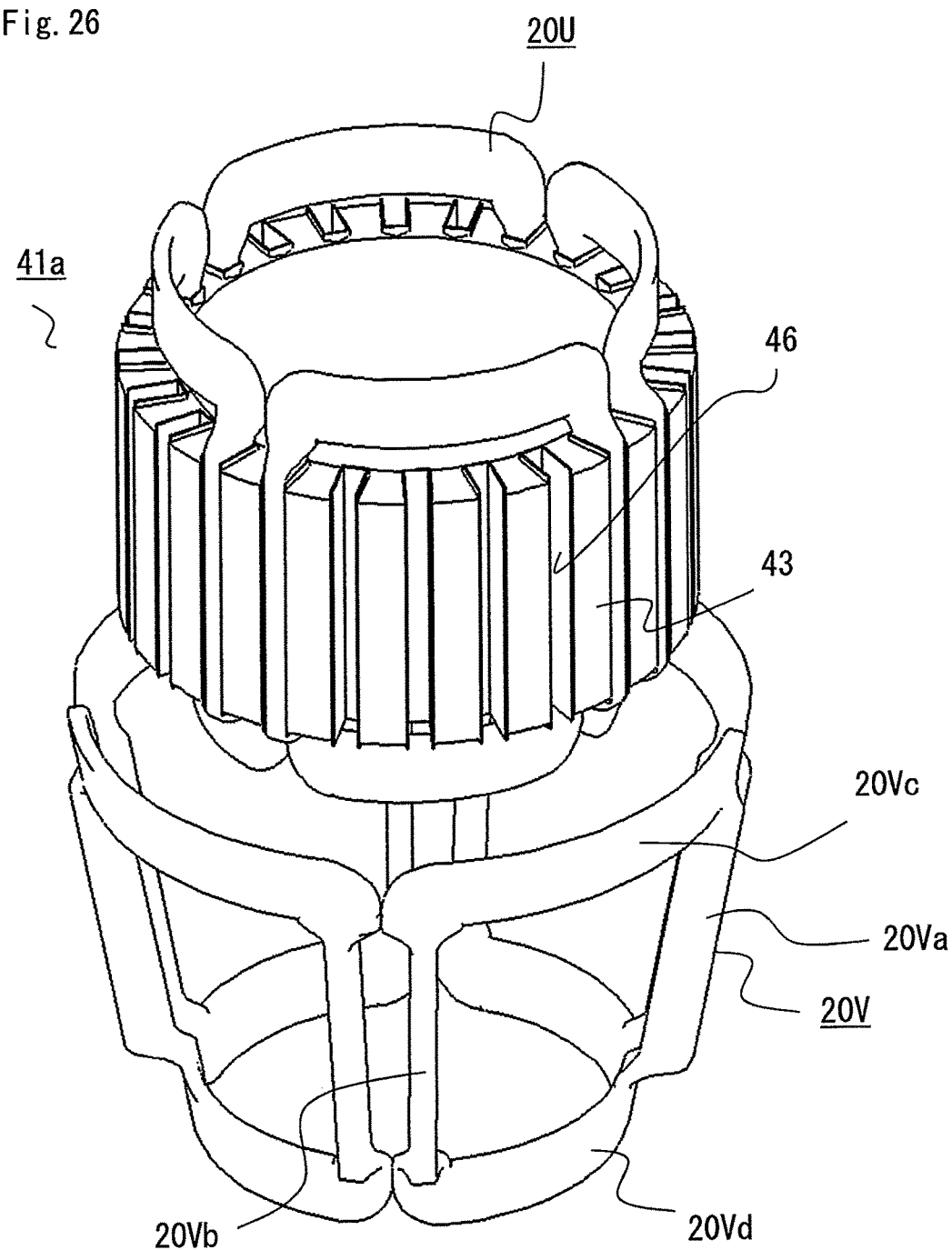
FIG. 26 is a diagram showing the coil temporary mounting step for V-phase according to Embodiment 1 of the present invention.
Figure 27:
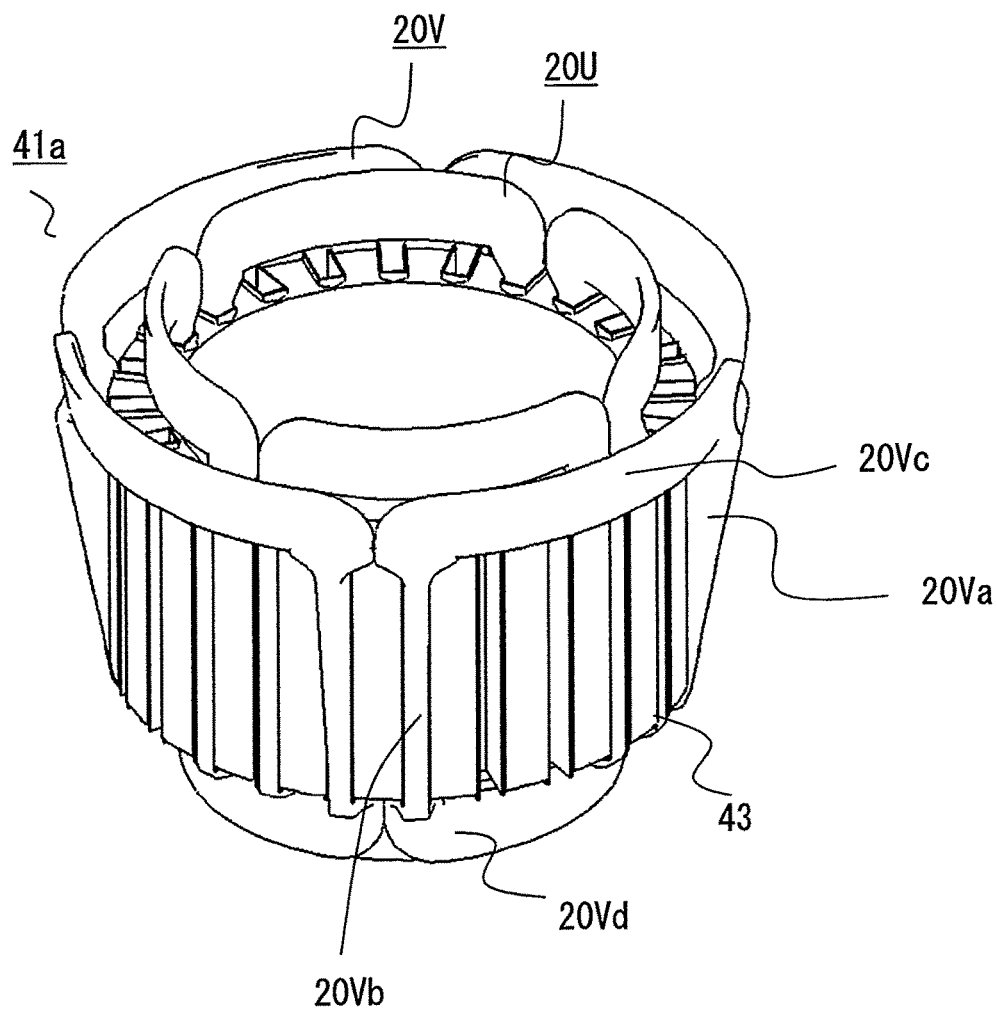
FIG. 27 is a diagram showing the coil temporary mounting step for V-phase according to Embodiment 1 of the present invention.

FIGS. 26 and 27 are diagrams showing the coil temporary mounting step ST120 for V-phase.

Figure 28:
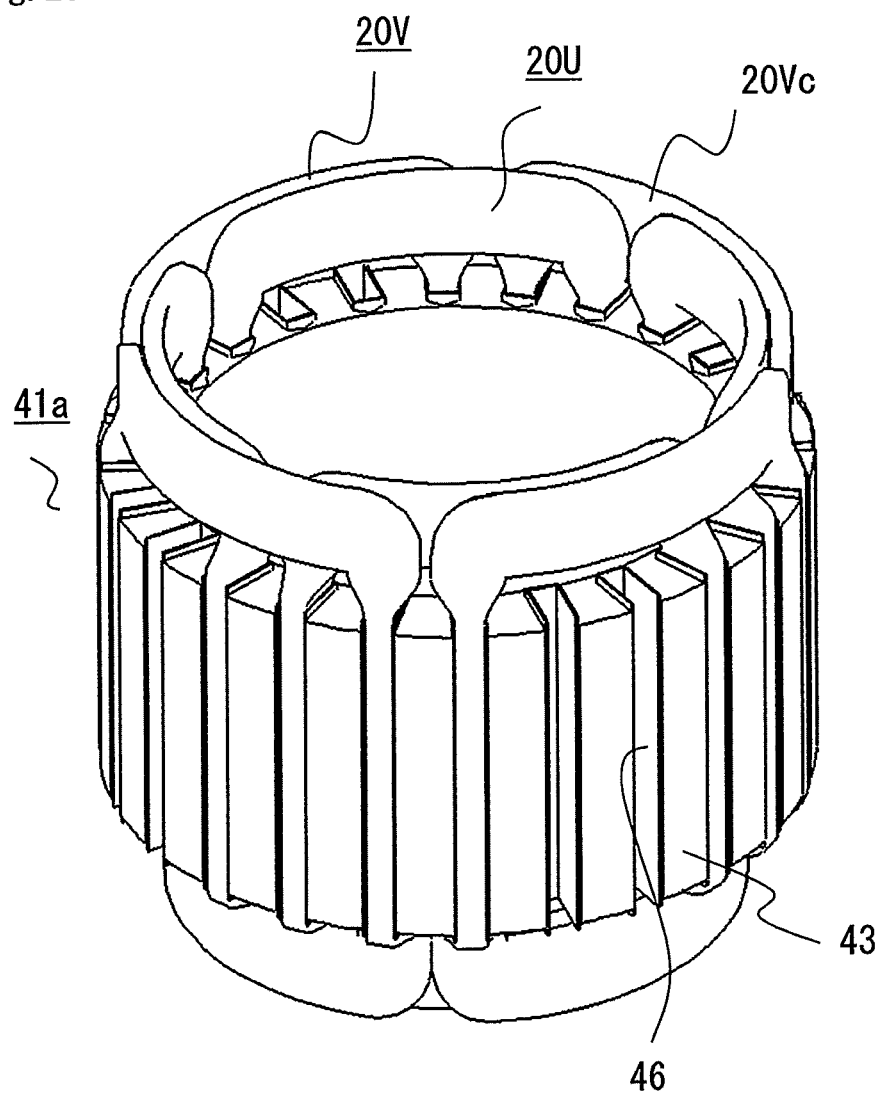
FIG. 28 is a diagram showing a state where the coil inserting step for V-phase according to Embodiment 1 of the present invention has ended.

FIG. 28 is a diagram showing a state after end of the coil temporary mounting step ST120 for V-phase. Next, as shown in FIGS. 26 to 28, all the coils 20V forming V-phase are mounted onto the inner core 41*a* having the coils 20U mounted thereon, similarly to the coils 20U described above.

Figure 29:
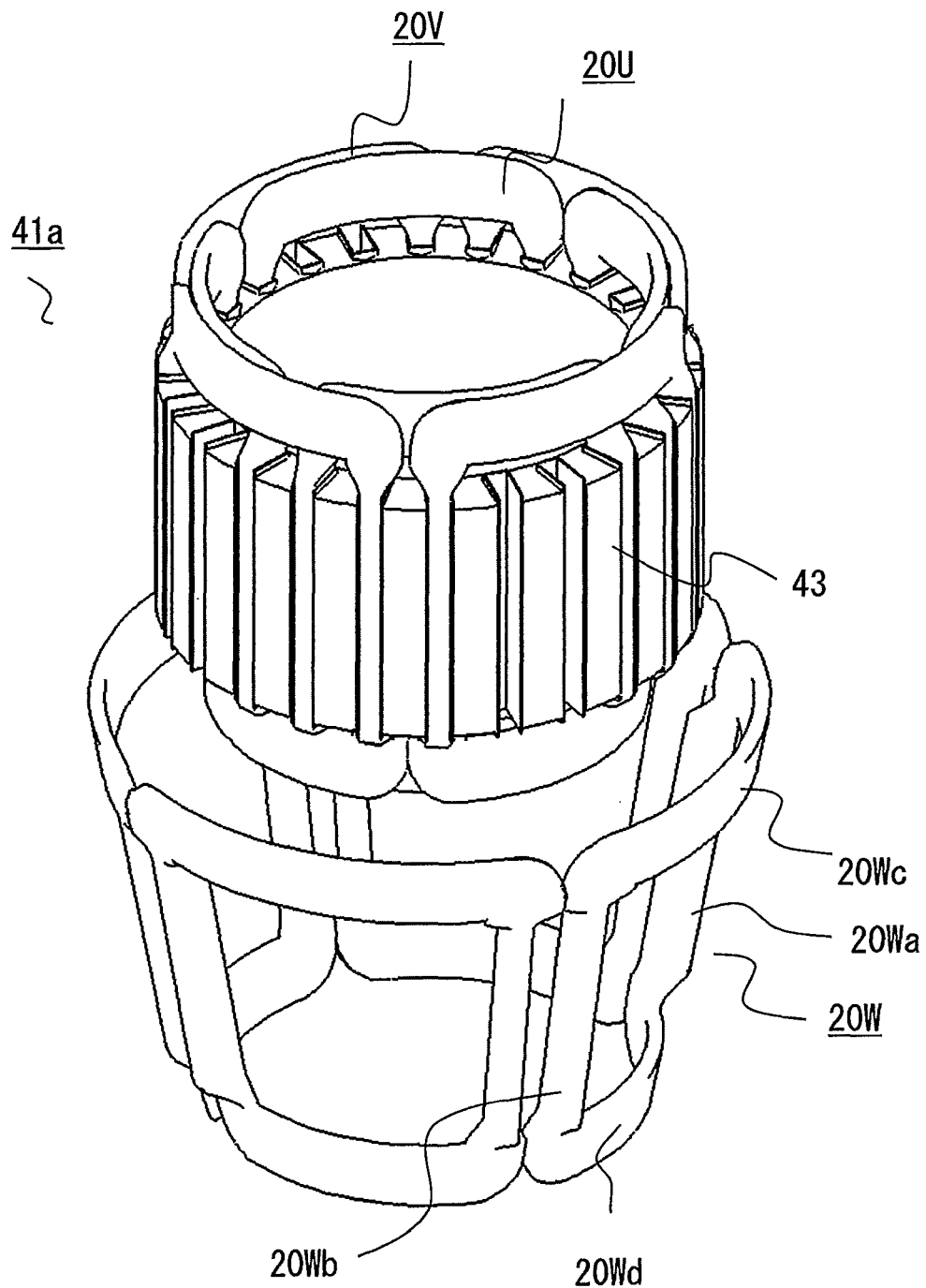
FIG. 29 is a diagram showing the coil temporary mounting step for W-phase according to Embodiment 1 of the present invention.
Figure 30:
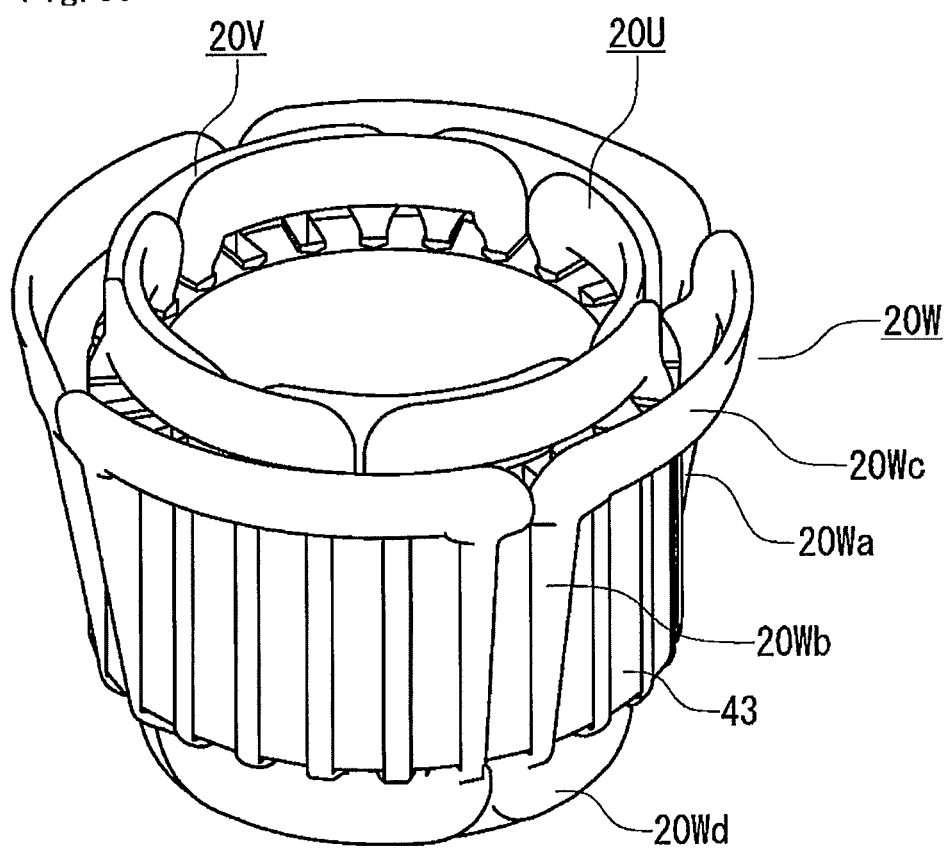
FIG. 30 is a diagram showing the coil temporary mounting step for W-phase according to Embodiment 1 of the present invention.

FIGS. 29 and 30 are diagrams showing the coil temporary mounting step ST120 for W-phase.

Figure 31:
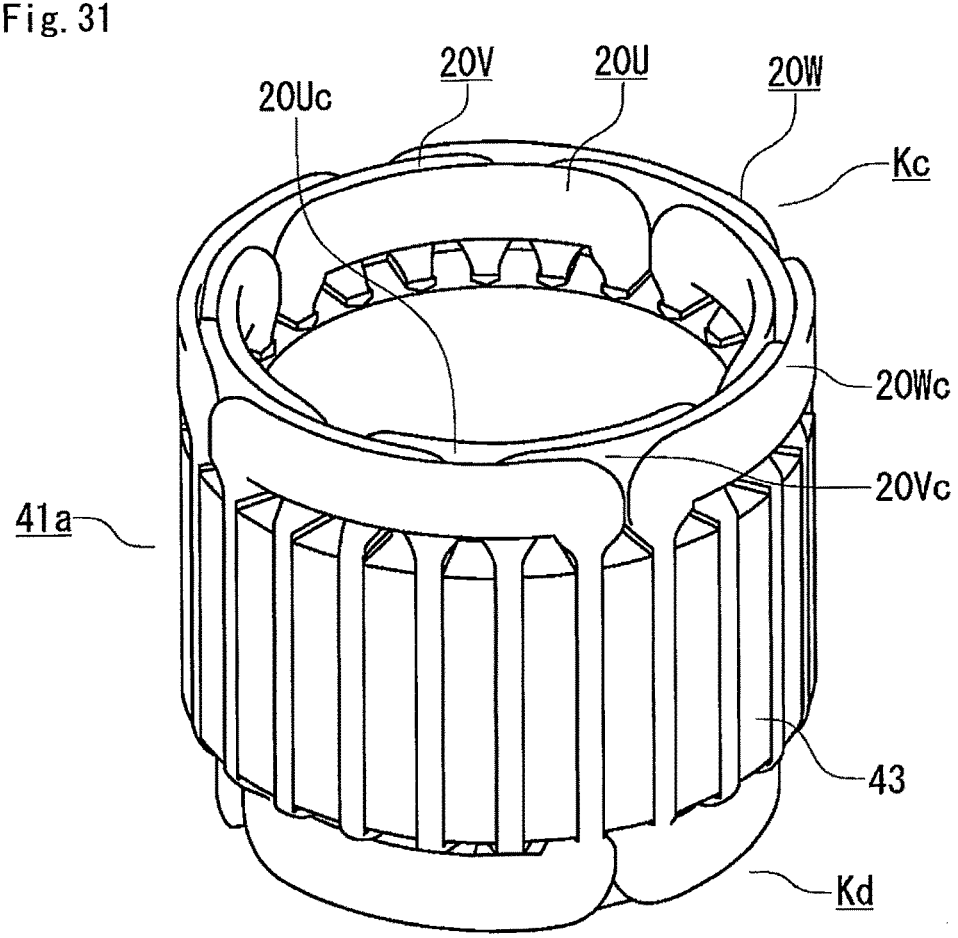
FIG. 31 is a diagram showing a state where the coil inserting step for W-phase according to Embodiment 1 of the present invention has ended.

FIG. 31 is a diagram showing a state after end of the coil inserting step ST130 for W-phase.

Next, as shown in FIGS. 29 to 31, all the coils 20W forming W-phase are mounted onto the inner core 41*a* having the coils 20V mounted thereon, similarly to the coils 20U and 20V described above. The coil temporary mounting step ST120 and the coil inserting step ST130 are completed by repeating this series of operations as described above. The bridge portions 20U*c*, 20V*c*, and 20W*c* form a coil end portion K*c* at the opened side, and bridge portions 20U*d*, 20V*d*, and 20W*d* form a coil end portion K*d* at the closed side.

Figure 32:
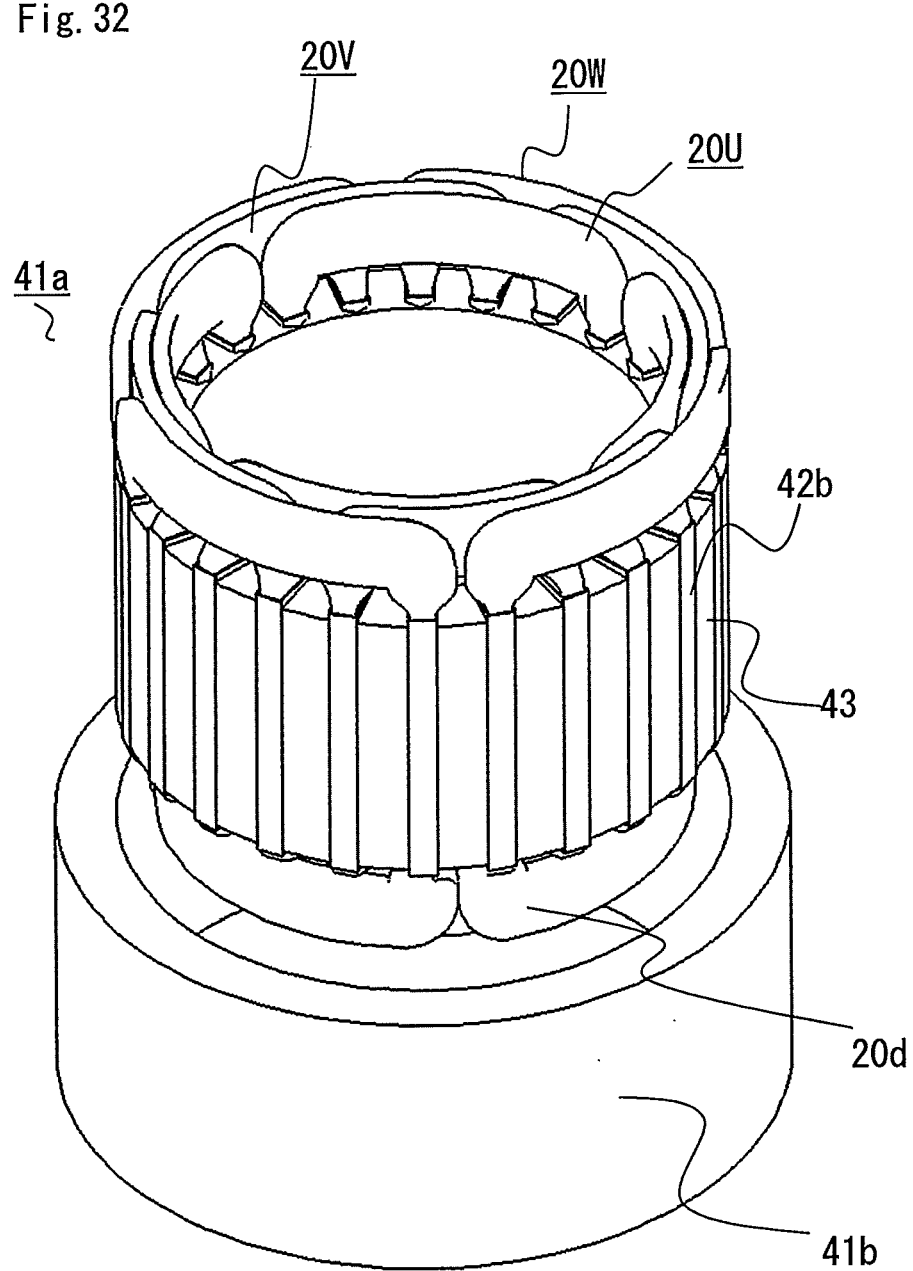
FIG. 32 is a perspective view showing a state immediately before the inner core having all the coils for three phases according to Embodiment 1 of the present invention mounted thereon is fitted to the outer core.

FIG. 32 is a perspective view showing a state immediately before the inner core 41*a* having all the coils 20 (20U, 20V, and 20W) for three phases mounted thereon is fitted to the outer core 41*b*.

Figure 33:
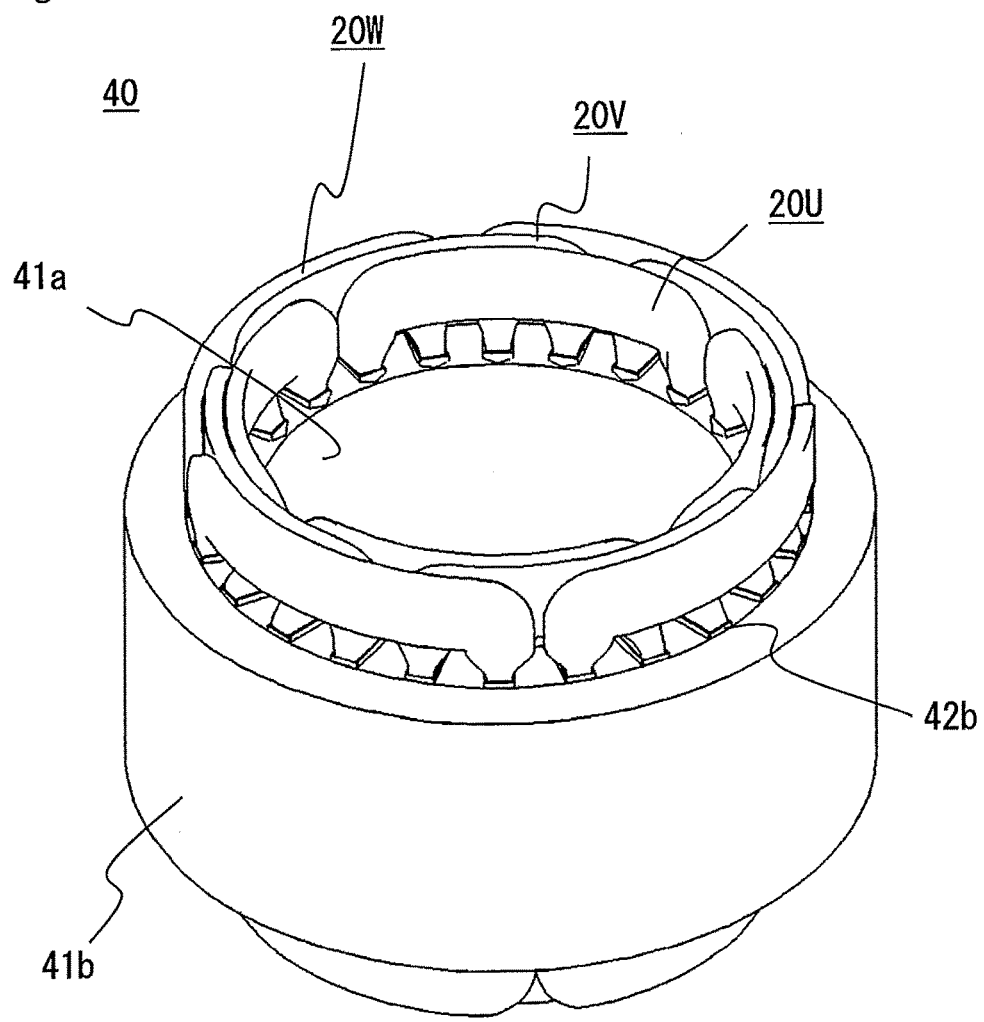
FIG. 33 is a perspective view of the stator that has been completed.

FIG. 33 is a perspective view of the stator 40 that has been completed.

Figure 34:
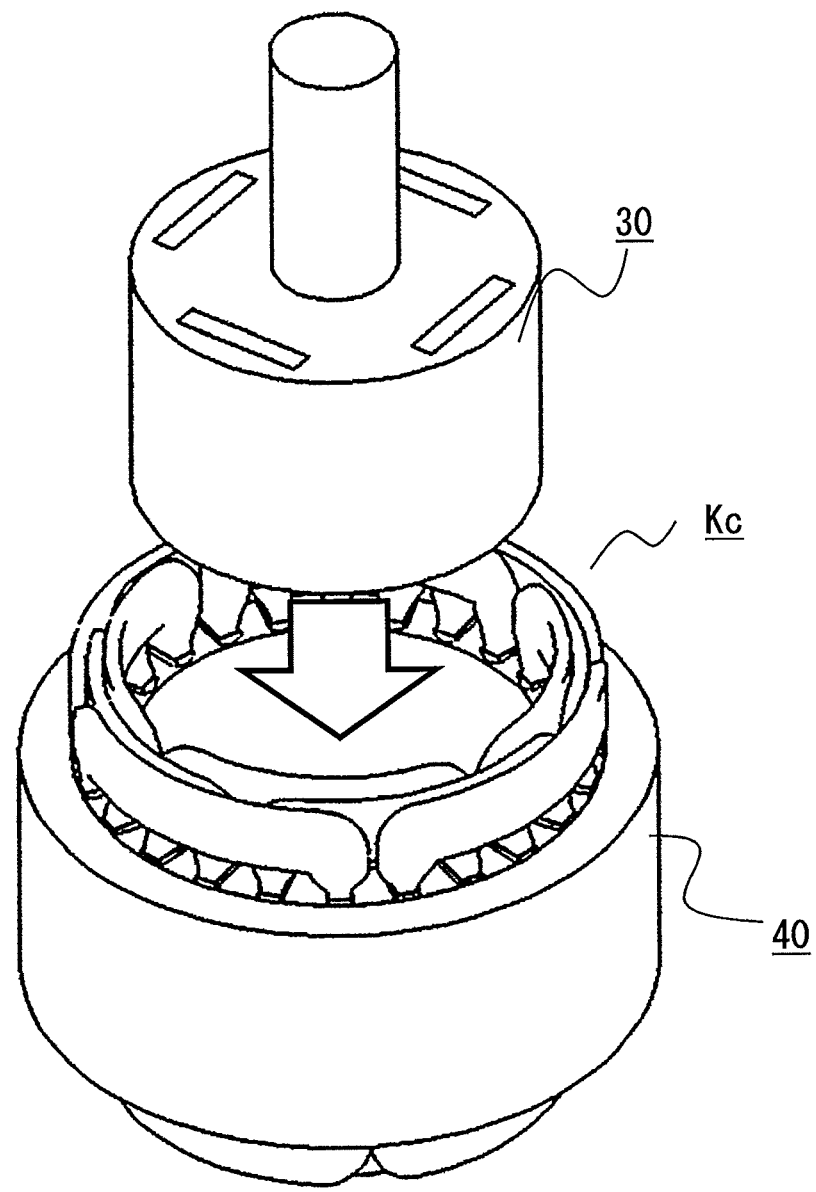
FIG. 34 is a diagram showing a final assembly step according to Embodiment 1 of the present invention.

FIG. 34 is a diagram showing a final assembly step of inserting the rotor 30 into the stator 40.

After all the coils 20 are fully mounted on the inner core 41*a*, slot cells 42*b* that insulate the outer core 41*b* and the respective coils 20 from each other are mounted at the outer peripheral surface side of the slot received portions 20*a* and 20*b* of the coils 20, and the outer core 41*b* is assembled from the closed-side bridge portion 20*d* side into the inner core 41*a*, to complete the core assembly step ST140 and obtain the stator 40.

Finally, the rotor 30 is inserted into the stator 40 from the coil end portion side at which the bridge portions 20*c* at the opened side are formed. Here, these components are received into the housing 1 shown in FIG. 1, to complete the final assembly step ST150, whereby the rotating electrical machine 100 can be obtained.

Figure 35:
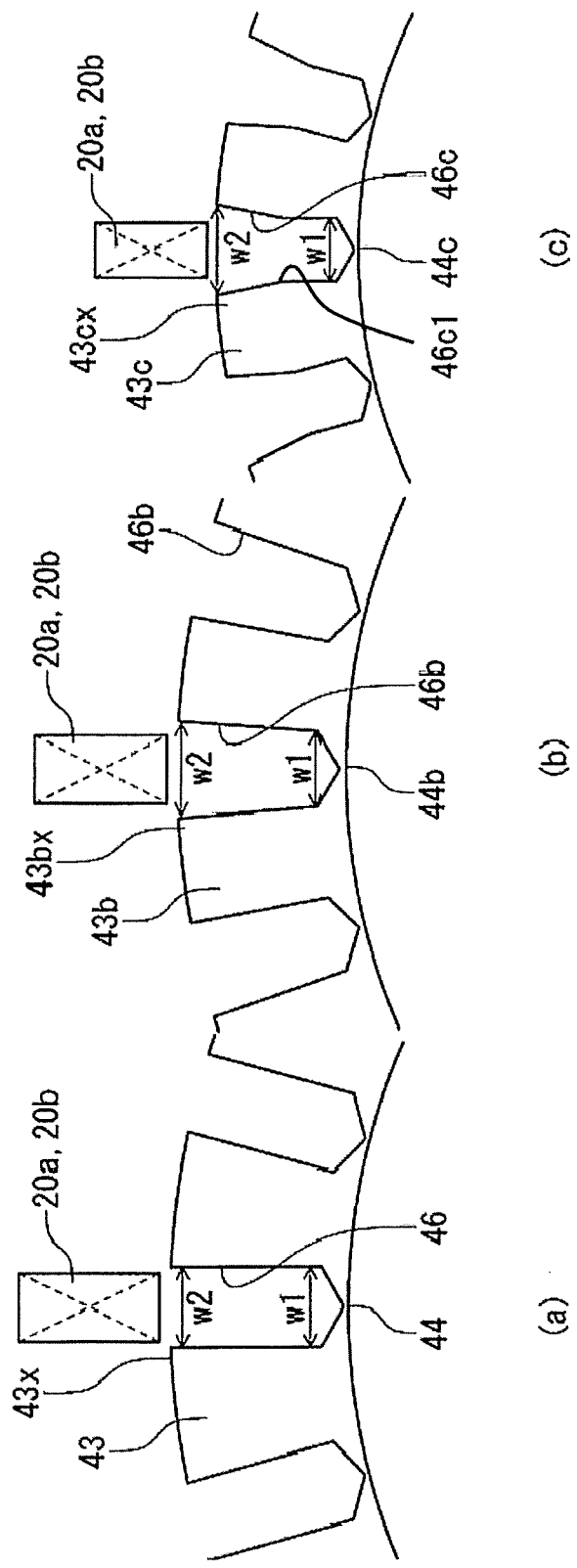
FIG. 35 is a diagram showing various slot shapes according to Embodiment 1 of the present invention.

FIG. 35 is a diagram showing various slot shapes, and each part is a plan view of a main portion of the inner core.

In the above description, in each slot 46, a cross-section perpendicular to the axial direction has a rectangular shape except for an innermost peripheral portion thereof, as shown in FIG. 35(*a*). However, the cross-section may have a tapered shape widening outward such that a relationship between a width dimension w1, in the circumferential direction, of a depth portion of a slot 46*b* and a width dimension w2 of a slot opening between outer peripheral side end portions of tooth portions 43*b* satisfies w2>w1, as shown in FIG. 35(*b*), or may have a shape having a change point 46*c*1 at which the gradient of a tapered shape changes, as shown in FIG. 35(*c*). If the relationship between the width dimension w1, in the circumferential direction, of the depth portion of the slot 46, 46*b*, or 46*c* and the width dimension w2 of the slot opening between the outer peripheral side end portions 43*x*, 43*bx*, or 43*cx* of the tooth portions 43, 43*b*, or 43*c* satisfies w2≥w1, the regularly aligned coils 20 can be smoothly inserted into the slots 46, so that the assemblability of the stator 40 improves. In the above embodiment, the case has been described in which at least one bridge portion among the bridge portions of each coil at both ends in the axial direction is located outward of the inner peripheral surface of the stator. However, the present invention is not limited thereto, and both of the bridge portions may be located outward of the inner peripheral surface of the stator.

According to the rotating electrical machine and the production method for the rotating electrical machine according to Embodiment 1 of the present invention, since the gap can be provided between the bridge portion of each coil and the end surface of the stator core in the axial direction, it is possible to provide: a rotating electrical machine that ensures a flow path for passing refrigerant such as air or cooling oil to improve coil cooling efficiency, while suppressing interference of coils forming each phase with coils forming another phase, and has a small size, high output, and high efficiency; and a production method for the rotating electrical machine.

Moreover, since the stator core is divided into the inner core (tooth portions) and the outer core (back yoke portion) and the ends of the respective tooth portions are connected to each other in the circumferential direction by the thin portion, the regularly aligned coils can be inserted into the slots, so that improvement in the space factor of the coils becomes possible. In addition, since the coil end portions of the coils forming the respective phases are disposed so as to be overlaid coaxially about the axis of the stator, assembly of the stator from one direction (the outer side) can be enabled.

Furthermore, since at least one bridge portion among the bridge portions of each coil at both ends in the axial direction is located outward of the inner peripheral surface of the stator, the rotor can be inserted into the stator having the coils mounted thereon, so that the productivity of the rotating electrical machine improves.

Embodiment 2

Hereinafter, a rotating electrical machine and a production method for the rotating electrical machine according to Embodiment 2 of the present invention will be described mainly regarding portions different from those in Embodiment 1.

Figure 36:
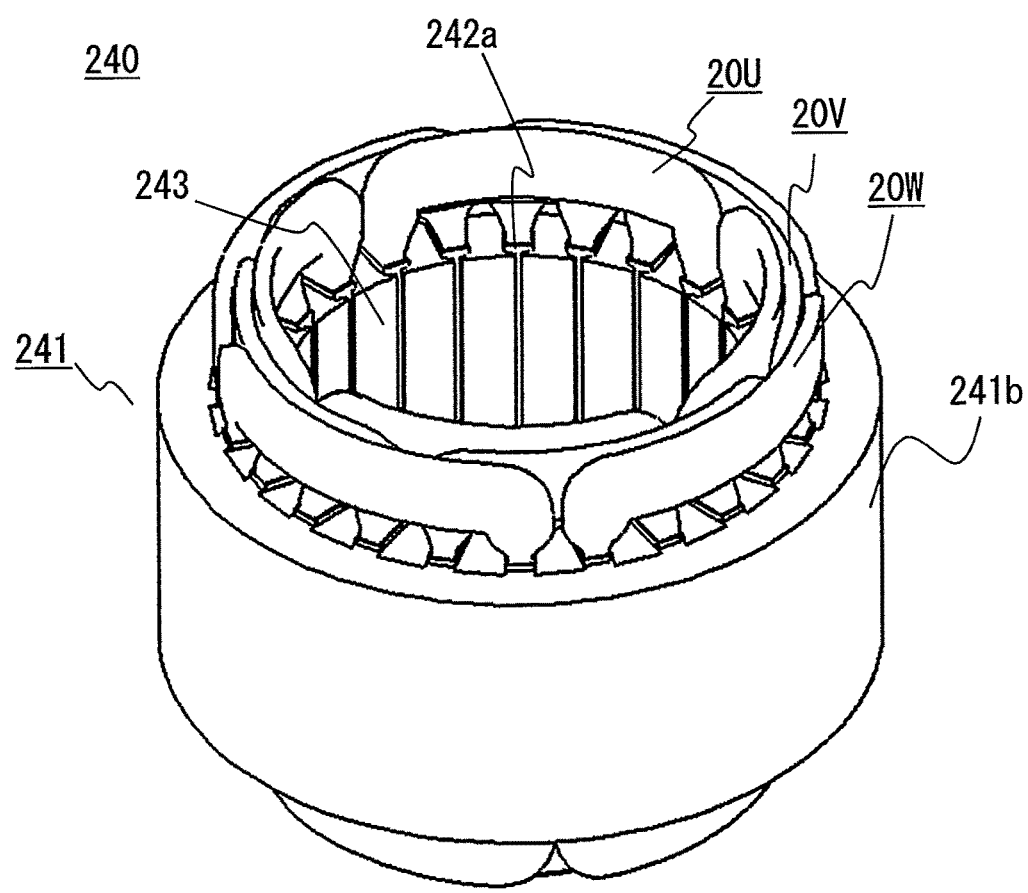
FIG. 36 is a perspective view of a stator according to Embodiment 2 of the present invention.

FIG. 36 is a perspective view of a stator 240 according to Embodiment 2.

As shown in the drawing, the stator 240 includes a stator core 241 and coils 20U, 20V, and 20W mounted on the stator core 241.

Figure 37:
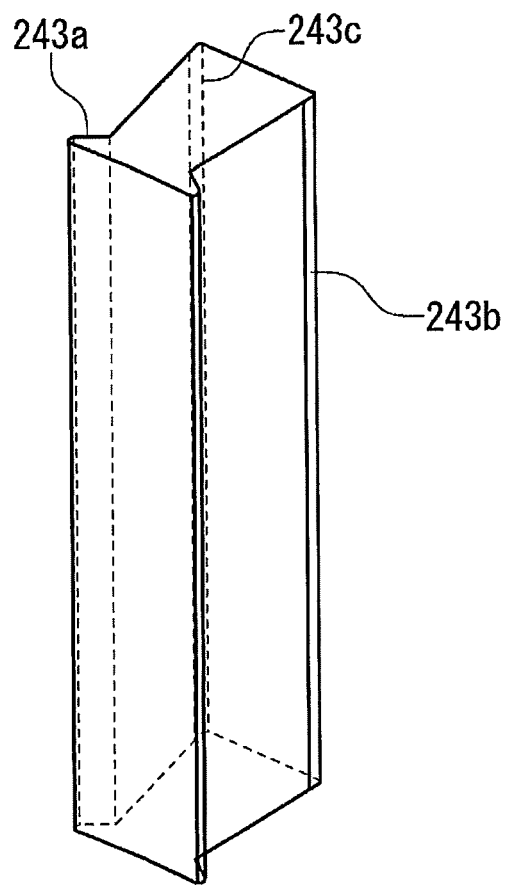
FIG. 37 is a perspective view of a tooth portion according to Embodiment 2 of the present invention.

FIG. 37 is a perspective view of a tooth portion 243 of the stator core 241.

Figure 38:
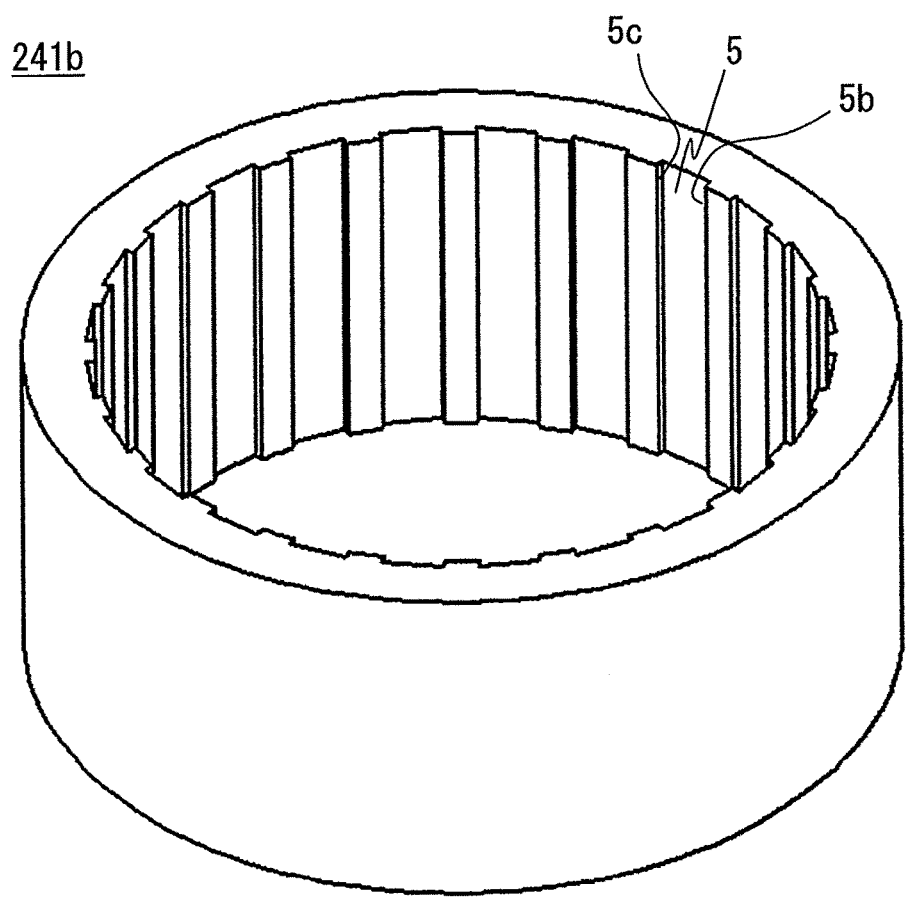
FIG. 38 is a perspective view of an outer core of a stator core according to Embodiment 2 of the present invention.

FIG. 38 is a perspective view of an outer core 241b of the stator core 241.

The stator core 241 includes: the tooth portions 243 forming magnetic poles, shown in FIG. 37; and the outer core 241b that is an annular back yoke portion, shown in FIG. 38. Each tooth portion 243 has, at an end thereof, flange portions 243a projecting at both sides in the circumferential direction.

Fit portions 243b and 243c are provided in predetermined ranges of base portions of both surfaces of each tooth portion 243 in the circumferential direction, and are fitted to wall surfaces 5b and 5c of corresponding one of grooves 5 provided on the inner peripheral surface of the outer core 241b and at regular intervals in the axial direction.

The production method for the rotating electrical machine according to the present embodiment will be described with reference to FIGS. 39 to 45. A winding step ST100 and a coil shaping step ST110 are the same as those in Embodiment 1, and thus the description thereof is omitted.

Figure 39:
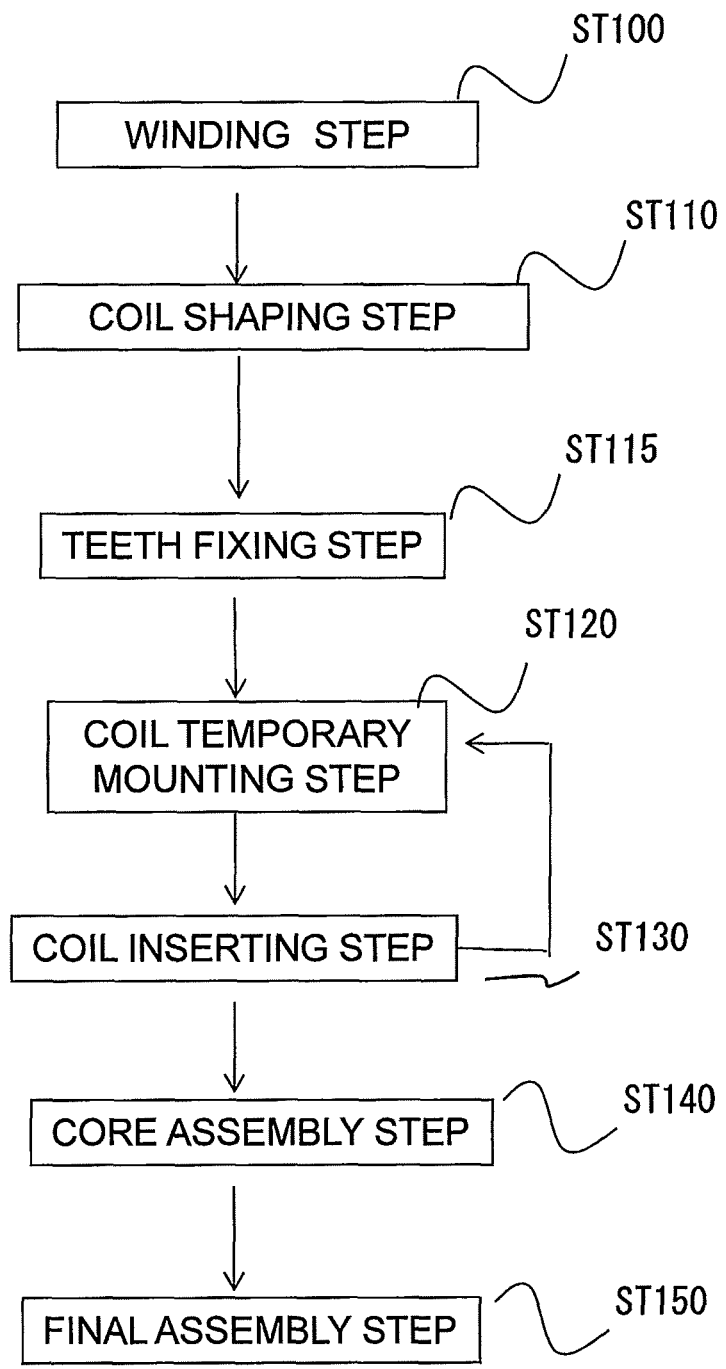
FIG. 39 is a flowchart showing a production process for a rotating electrical machine according to Embodiment 2 of the present invention.

FIG. 39 is a flowchart showing a production process for the rotating electrical machine according to the present embodiment.

Figure 40:
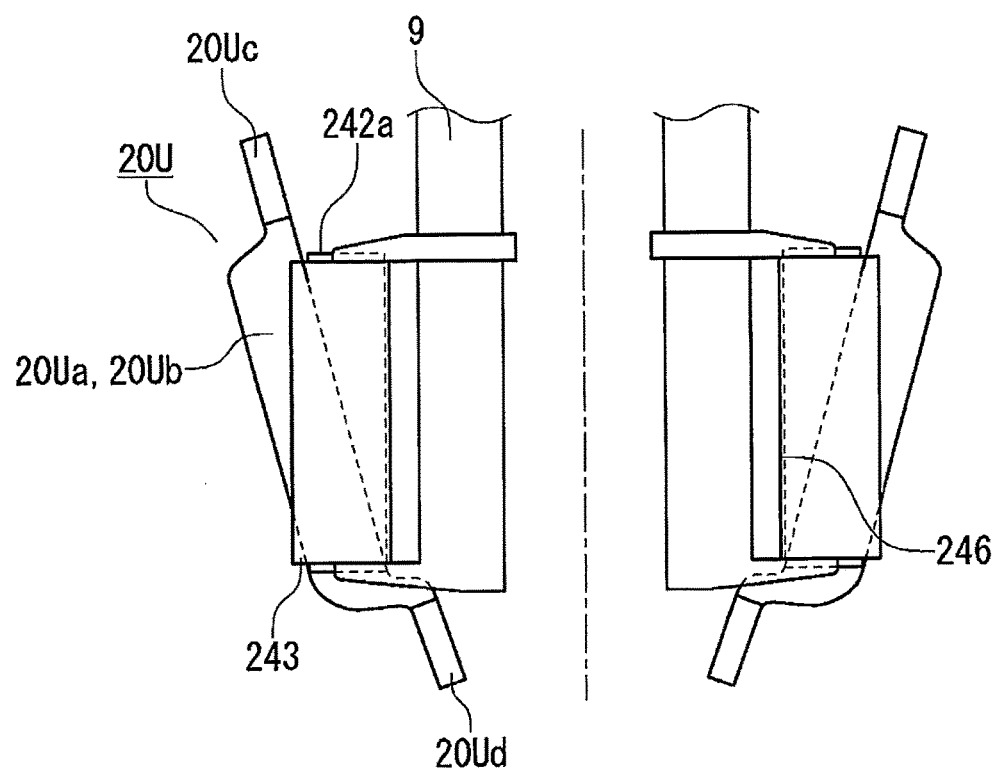
FIG. 40 is a diagram showing a coil temporary mounting step for U-phase according to Embodiment 2 of the present invention.

FIG. 40 is a diagram showing a coil temporary mounting step ST120, and shows a state where the coil 20U is temporarily mounted in slots 246 between the tooth portions 243 fixed by a tooth retainer 9.

Figure 41:
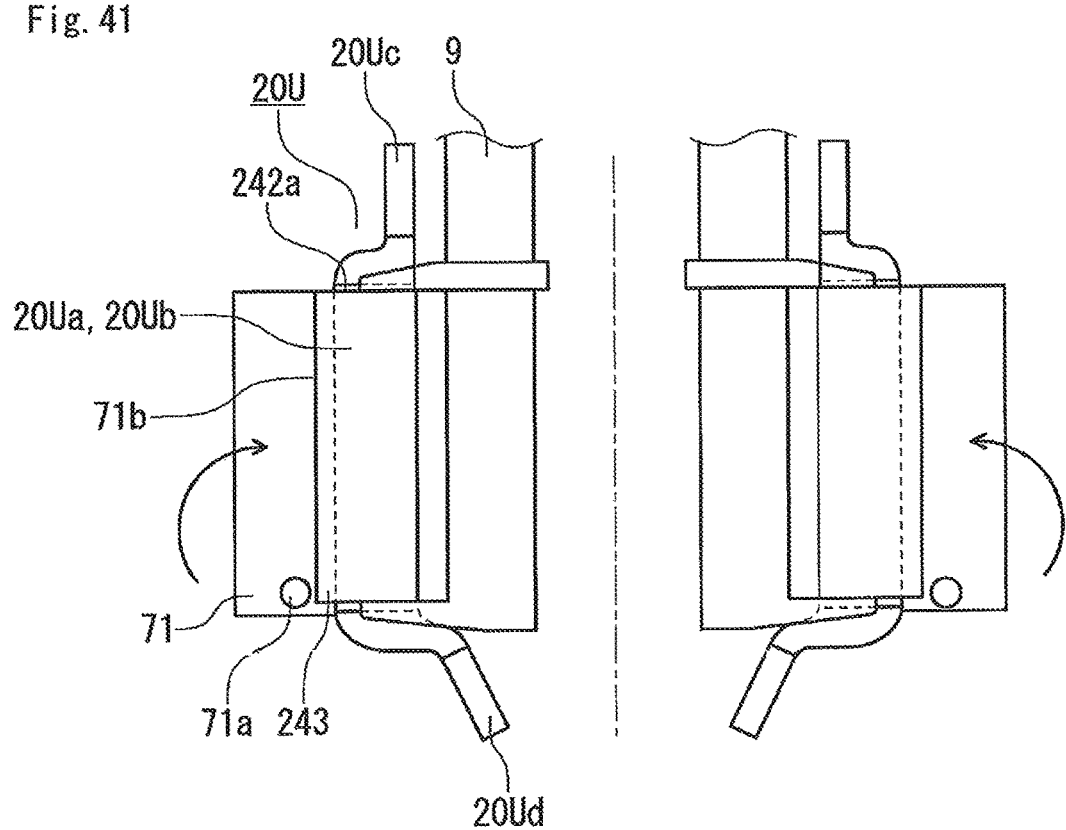
FIG. 41 is a diagram showing a state of a coil after end of a coil inserting step for U-phase according to Embodiment 2 of the present invention.

FIG. 41 is a diagram showing a state of the coil 20U after end of a coil inserting step ST130.

FIGS. 40 and 41 are cross-sectional schematic diagrams centered at the axis of the tooth retainer 9.

The tooth portions 243 according to the present embodiment are separate from each other, and are not connected at ends thereof at the inner peripheral side by a thin portion, like the tooth portions 43 of Embodiment 1. However, all the tooth portions correspond to the inner core of Embodiment 1.

Therefore, all the tooth portions 243 need to be arranged radially beforehand, and a teeth fixing step ST115 of fixing by the tooth retainer 9 as shown in FIG. 40 needs to be performed before the coil temporary mounting step ST120. Then, in the coil temporary mounting step ST120, the U-phase coils 20U are temporarily mounted into the slots 246 each formed between the fixed tooth portions 243 adjacent to each other, similarly as in Embodiment 1. Next, the coil inserting step ST130 shown in FIG. 41 is performed similarly as in Embodiment 1.

Figure 42:
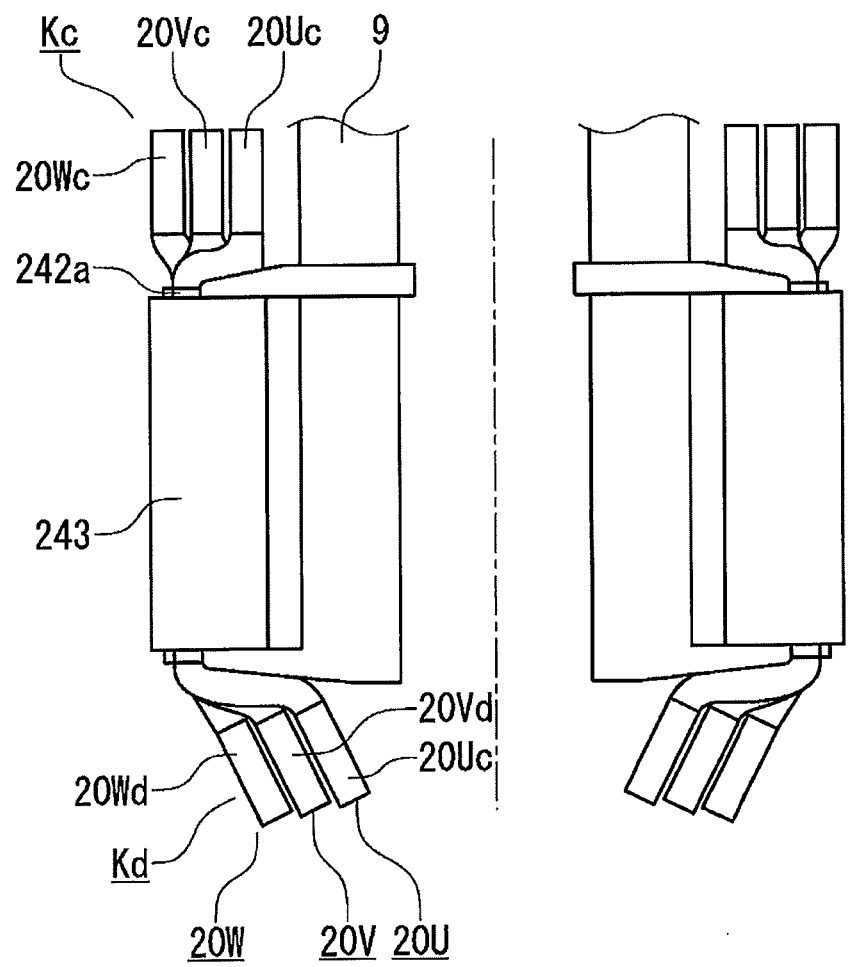
FIG. 42 is a cross-sectional view showing the tooth portions and the coils after end of the coil inserting step for all three phases according to Embodiment 2 of the present invention.

FIG. 42 is a cross-sectional view showing the tooth portions 243 and the coils 20 after end of the coil inserting step for all three phases. Bridge portions 20Uc, 20Vc, and 20Wc form a coil end portion Kc at the opened side, and bridge portions 20Ud, 20Vd, and 20Wd form a coil end portion Kd at the closed side.

Figure 43:
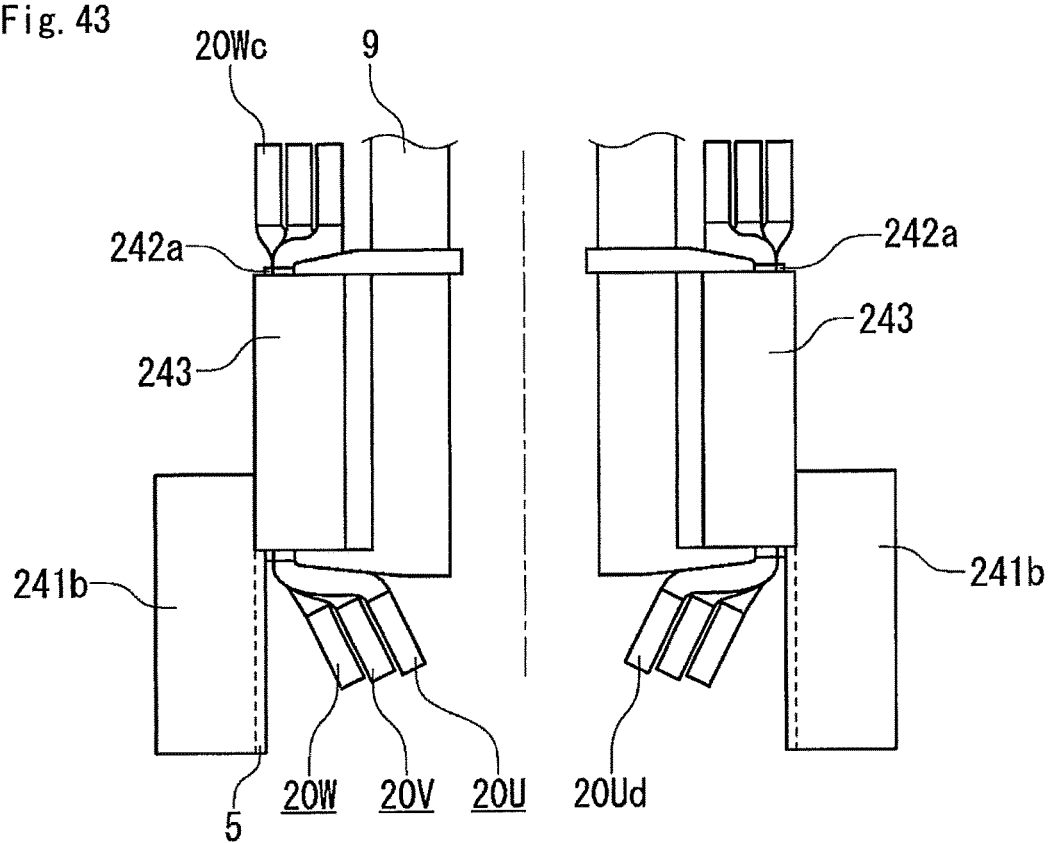
FIG. 43 is a cross-sectional view of a stator being assembled in a core assembly step according to Embodiment 2 of the present invention.
Figure 44:
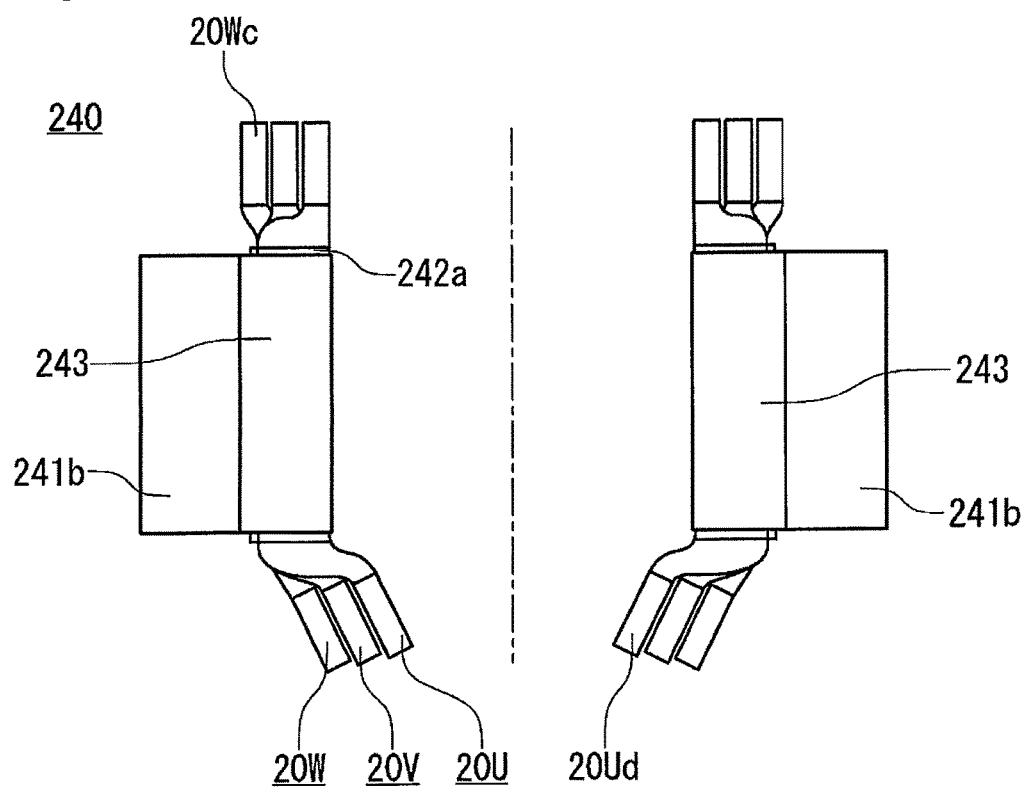
FIG. 44 is a cross-sectional view of the stator being assembled in the core assembly step according to Embodiment 2 of the present invention.

FIGS. 43 and 44 are cross-sectional views of the stator 240 being assembled in a core assembly step ST140.

After all the coils 20U, 20V, and 20W are fully inserted as shown in FIG. 42, the fit portions 243b and 243c of all the tooth portions 243 are fitted into the grooves 5 of the outer core 241b as shown in FIGS. 43 and 44, to obtain the stator 240. After the outer core 241b and all the tooth portions 243 are fitted and fixed, the tooth retainer 9 is detached.

Figure 45:
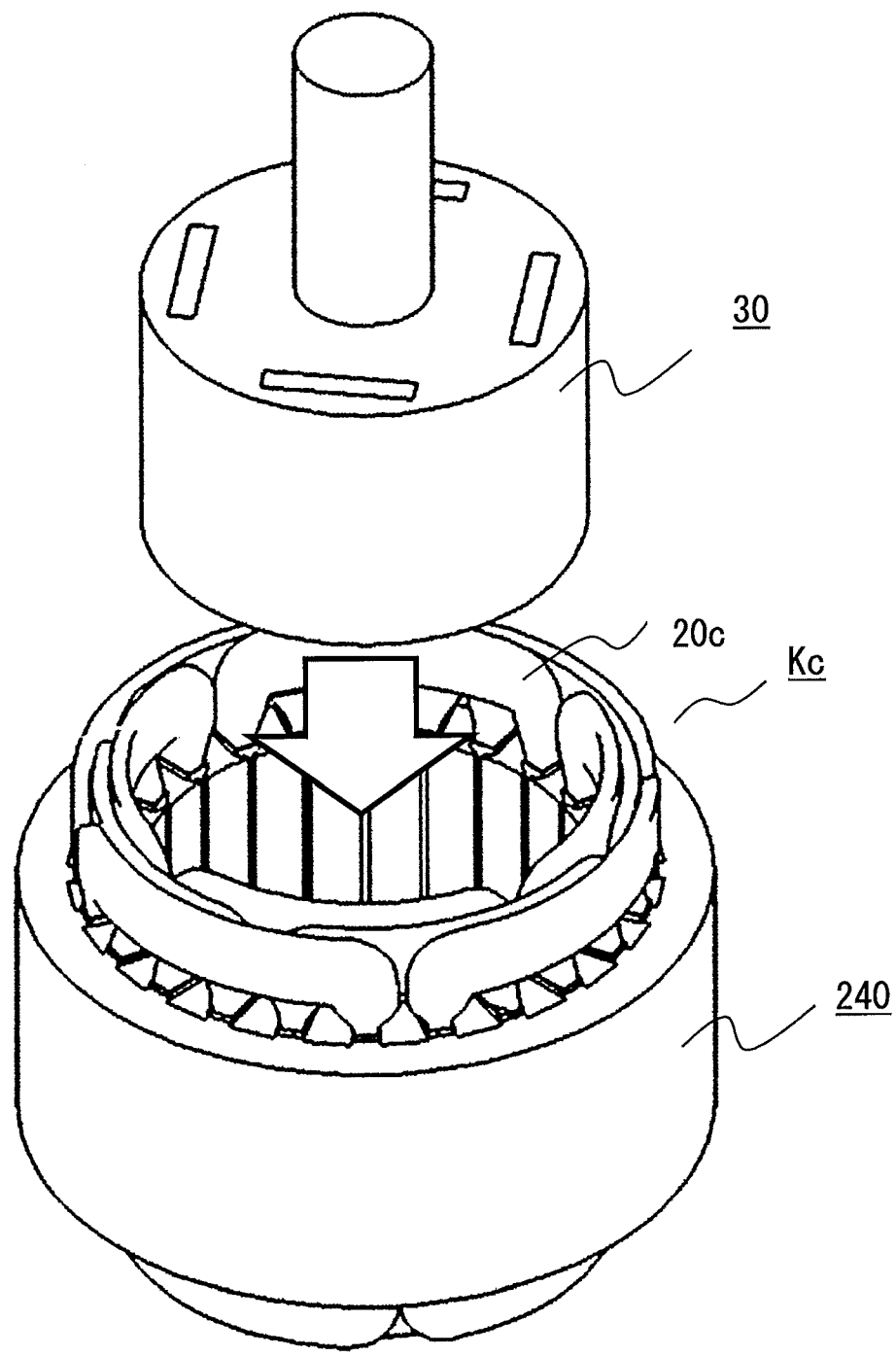
FIG. 45 is a diagram showing a final assembly step according to Embodiment 2 of the present invention.

FIG. 45 is a diagram showing a final assembly step of inserting a rotor 30 into the stator 240.

Finally, the rotor 30 is inserted into the stator 240 from the coil end portion Kc side at which the bridge portions 20c at the opened side are formed. Here, these components are received into a housing that is not shown, to complete the final assembly step ST150, whereby the rotating electrical machine can be obtained.

According to the rotating electrical machine and the production method for the rotating electrical machine according to Embodiment 2 of the present invention, the same advantageous effects as those in Embodiment 1 are obtained. In addition, since the ends of the tooth portions 243 at the inner peripheral side are not connected to each other by a thin portion and the flange portions 243a projecting at both sides in the circumferential direction are formed so that magnetic connection is cut, leakage flux of the stator 240 can be reduced, so that torque of the rotating electrical machine can be increased. Moreover, since it is not necessary to pass each coil 20 through a narrow opening between the flange portions 243a adjacent to each other, limitations on the width of the opening between the flange portions are reduced, so that flexibility in designing the stator improves. Accordingly, a rotating electrical machine having a high coil space factor and less torque ripples can be provided.

It is noted that, within the scope of the present invention, the above embodiments may be freely combined with each other, or each of the above embodiments may be modified or abbreviated as appropriate.

The invention claimed is:

1. A production method for a rotating electrical machine including: a stator having a stator core including an outer core as an annular back yoke portion and an inner core as a plurality of tooth portions, and a plurality of insulated and coated coils each received in two slots each formed between the two tooth portions adjacent to each other, the coils extending over the plurality of tooth portions of the stator core; and a rotor rotatably supported at an inner side of the stator core, the production method comprising:

a winding step of continuously forming intermediate coils each including two slot received portions to be received in the slots of the stator core and two bridge portions by which both end portions of the slot received portions are connected, into a flat plate shape from an insulated and coated conductor wire by using a winding frame that has winding core and side plates that sandwich the winding core from both side surface sides thereof, and a protection that restricts a winding width of the bridge portions is provided on the inner surfaces of the side plates;

a coil shaping step of twisting the two slot received portions of each intermediate coil and shaping each bridge portion into a circular arc shape;

a coil temporary mounting step of temporarily mounting each coil subjected to the coil shaping step, obliquely in the two slots;

a coil inserting step of pressing the slot received portions of each coil subjected to the coil temporary mounting step, from an outer side to a radially inner side to insert the slot received portions into the slots;

a core assembly step of inserting the inner core having each coil mounted thereon, into the outer core; and a final assembly step inserting the rotor into the stator and housing the stator and the rotor in a frame.

2. The production method for the rotating electrical machine according to claim 1, further comprising a teeth fixing process of radially fixing the plurality of independent tooth portions, prior to the coil temporary mounting step.

3. The production method for the rotating electrical machine according to claim 1, wherein the coil inserting step includes pressing entireties of outer peripheral surfaces of the slot received portions of the coil temporarily mounted obliquely in the slots, by a rotary plate jig rotating about one point, to insert the slot received portions.

4. The production method for the rotating electrical machine according to claim 1, wherein the coil inserting step includes pressing outer peripheral surfaces of the slot received portions of the coil temporarily mounted obliquely in the slots, from one end side toward another end side in an axial direction by a roller jig to insert the slot received portions.

5. The production method for the rotating electrical machine according to claim 1, wherein the coil inserting step includes inserting the inner core into a cylindrical slide jig to insert the slot received portions of the coil temporarily mounted obliquely in the slots, into the slots.

* * * * *